(12) United States Patent
Hook

(10) Patent No.: US 11,812,245 B2
(45) Date of Patent: Nov. 7, 2023

(54) METHOD, APPARATUS, AND COMPUTER-READABLE STORAGE MEDIUM FOR PROVIDING THREE-DIMENSIONAL STEREO SOUND

(71) Applicant: Valeo North America, Inc., Troy, MI (US)

(72) Inventor: Brandon Hook, Troy, MI (US)

(73) Assignee: Valeo Telematik und Akustik GmbH, Friedrichsdorf (DE)

( * ) Notice: Subject to any disclaimer, the term of this patent is extended or adjusted under 35 U.S.C. 154(b) by 0 days.

(21) Appl. No.: 17/066,250

(22) Filed: Oct. 8, 2020

(65) Prior Publication Data

US 2022/0116709 A1  Apr. 14, 2022

(51) Int. Cl.
  *H04R 5/04* (2006.01)
  *B60R 11/02* (2006.01)
  *B60W 30/08* (2012.01)
  *B60W 50/14* (2020.01)
  *H04R 5/02* (2006.01)

(52) U.S. Cl.
  CPC ............ *H04R 5/04* (2013.01); *B60R 11/0217* (2013.01); *B60W 30/08* (2013.01); *B60W 50/14* (2013.01); *H04R 5/02* (2013.01); *B60W 2050/143* (2013.01); *B60W 2420/54* (2013.01); *H04R 2499/13* (2013.01)

(58) Field of Classification Search
  CPC ...... H04R 2499/13; H04R 5/02; H04R 3/005; H04R 2203/12; H04S 2400/11
  USPC .......................................... 381/86, 310, 300
  See application file for complete search history.

(56) References Cited

U.S. PATENT DOCUMENTS

| | | |
|---|---|---|
| 8,831,255 B2 | 9/2014 | Crawford et al. |
| 2007/0021915 A1* | 1/2007 | Breed ................... G08G 1/166 701/301 |

(Continued)

FOREIGN PATENT DOCUMENTS

| | | |
|---|---|---|
| JP | 2009-51333 | 3/2009 |
| WO | WO 2005/004534 A1 | 1/2005 |

OTHER PUBLICATIONS

Modifications of the Surrounding Auditory Space by Augmented Reality Audio: Introduction to Warped Acoustic Reality, Dominik Sotrek et al.; The 21st International Conference on Auditory Display (ICAD 2015); Jul. 8-10, 2015, Graz, Austria (6 pages).

*Primary Examiner* — Alexander Krzystan
(74) *Attorney, Agent, or Firm* — Oblon, McClelland, Maier & Neustadt, L.L.P.

(57) ABSTRACT

The present disclosure relates to a method, apparatus, and computer-readable storage medium for providing three-dimensional stereo sound to a vehicle to promote active safety and awareness to hazards. For instance, the present disclosure describes a method for providing three-dimensional stereo sound comprising receiving data signals from sensors positioned around an exterior of a vehicle, detecting a hazard based on the received data signals, determining characteristics of the detected hazard, generating an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

11 Claims, 17 Drawing Sheets

(56) References Cited

U.S. PATENT DOCUMENTS

| | | | |
|---|---|---|---|
| 2014/0140552 A1* | 5/2014 | Hui | H04R 5/0335 |
| | | | 381/309 |
| 2015/0025662 A1 | 1/2015 | Di Censo et al. | |
| 2015/0061895 A1* | 3/2015 | Ricci | B60K 28/00 |
| | | | 340/902 |
| 2015/0137998 A1* | 5/2015 | Marti | B60C 9/00 |
| | | | 340/901 |
| 2018/0046869 A1* | 2/2018 | Cordell | G06K 9/00845 |

* cited by examiner

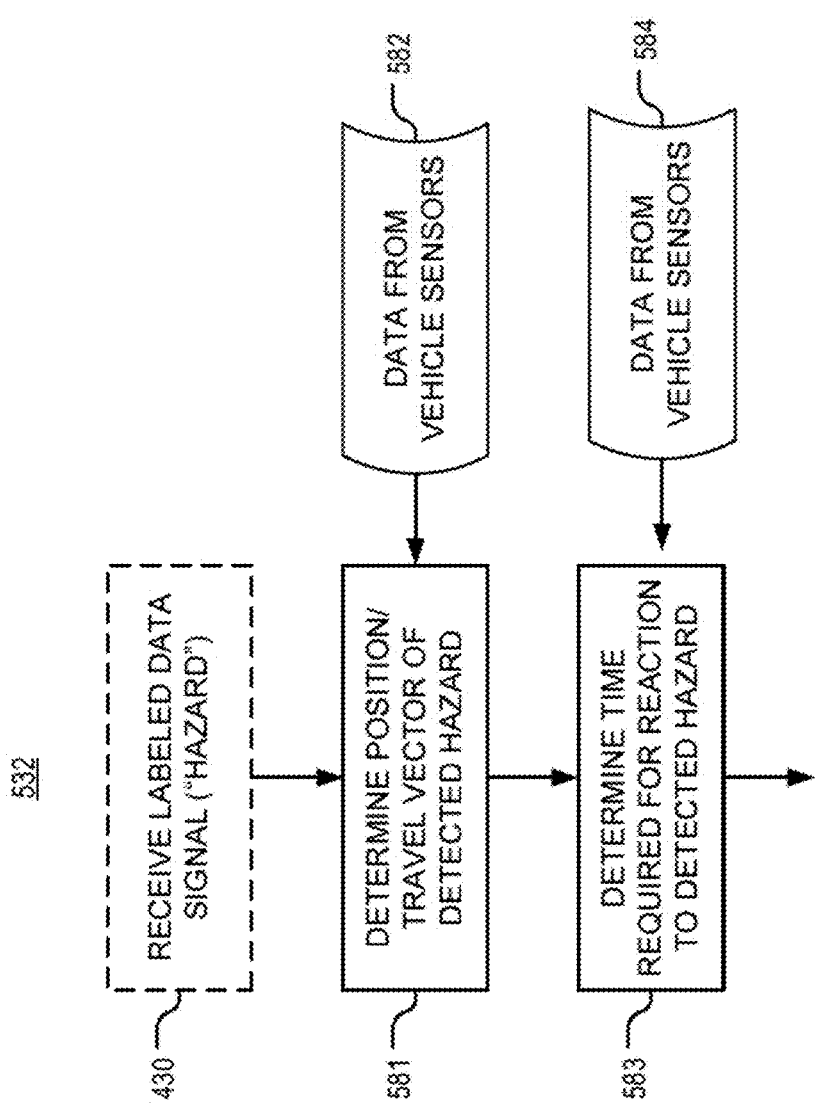

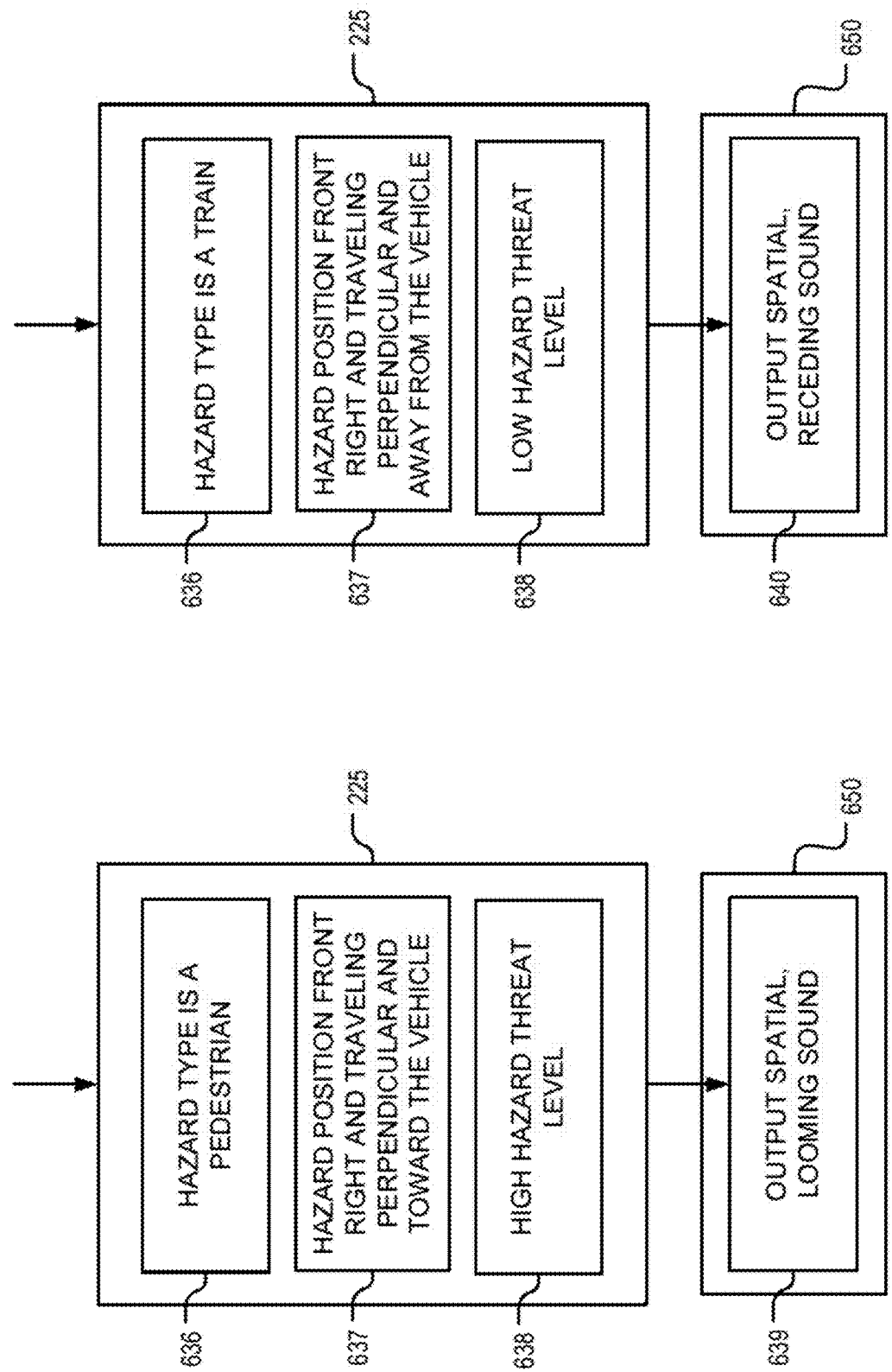

METHOD, APPARATUS, AND COMPUTER-READABLE STORAGE MEDIUM FOR PROVIDING THREE-DIMENSIONAL STEREO SOUND

BACKGROUND

Field of the Disclosure

The present disclosure relates to threat detection during operation of an automotive vehicle.

Description of the Related Art

At present, vehicle safety systems provide little more than rudimentary alerts when potential hazards are identified. This is typified by a beeping sound emitted from vehicle speakers when a neighboring vehicle is located in a 'blind spot' of a driver. Such alert, however, does not obviate the need for the driver to visually locate the neighboring vehicle and determine a threat level thereof. Therefore, human drivers remain largely dependent upon their own faculties in identifying hazards and determining the relevance of those hazards to their course of travel. In many cases, hazards that may be preliminarily located by hearing must be secondarily confirmed by vision in order for the driver to be able to competently respond to a potential threat posed by the hazard. Such redundancies not only unnecessarily distract the driver from the road but also fail to exploit the capabilities of human physiology and neurology in being alerted to and responding to potential hazards. Accordingly, a method for providing directed alerts while minimally impacting driver focus is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and computer-readable storage medium comprising processing circuitry configured to perform a method for providing three-dimensional sound within a vehicular environment.

According to an embodiment, the present disclosure further relates to a method for providing three-dimensional stereo sound, comprising receiving data signals from sensors positioned around an exterior of a vehicle, detecting a hazard based on the received data signals, determining characteristics of the detected hazard, generating, by processing circuitry, an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

According to an embodiment, the present disclosure further relates to an apparatus for providing three-dimensional stereo sound, comprising processing circuitry configured to receive data signals from sensors positioned around an exterior of a vehicle, detect a hazard based on the received data signals, determine characteristics of the detected hazard, generate an alert based on the determined characteristics of the detected hazard, and output the generated alert as the three-dimensional stereo sound via speakers arranged around an interior of the vehicle, the outputted alert communicating to a driver of the vehicle the determined characteristics of the detected hazard.

According to an embodiment, the present disclosure further relates to a non-transitory computer-readable storage medium storing computer-readable instructions that, when executed by a computer, cause the computer to perform a method for providing three-dimensional stereo sound, the method comprising receiving data signals from sensors positioned around an exterior of a vehicle, detecting a hazard based on the received data signals, determining characteristics of the detected hazard, generating an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5D is a flow diagram of a sub process of a method for providing three-dimensional stereo sound, according to an exemplary embodiment of the present disclosure;

FIG. 6B is a flow diagram of a sub process of a method for providing three-dimensional stereo sound, according to an exemplary embodiment of the present disclosure;

FIG. 6C is a flow diagram of a sub process of a method for providing three-dimensional stereo sound, according to an exemplary embodiment of the present disclosure;

DETAILED DESCRIPTION

Figure 1:
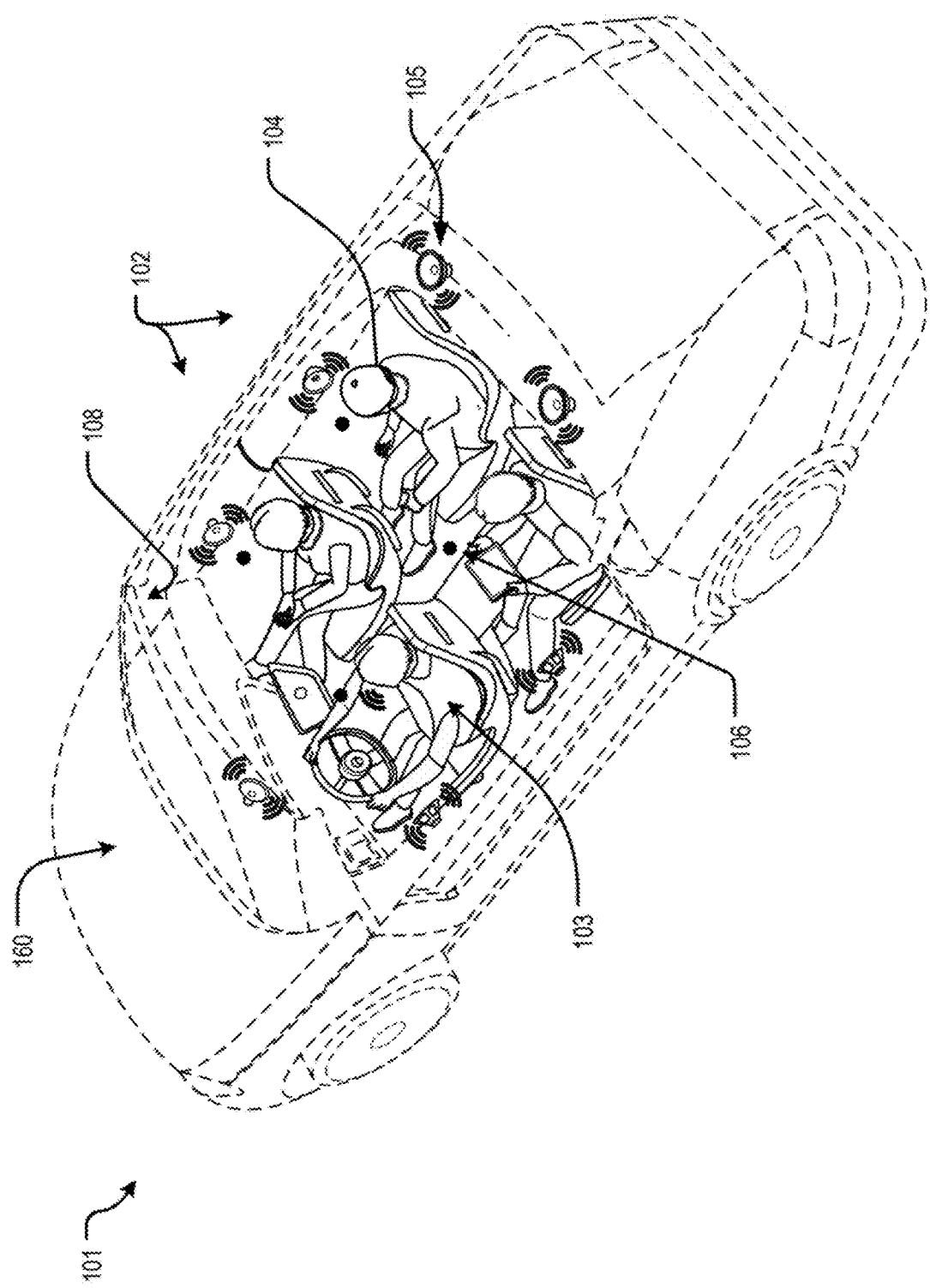
FIG. 1 is an illustration of an in-car communication system of a vehicle, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, strictures, or characteristics may be combined in any suitable manner in one or more embodiments without limitation.

Though modern vehicle safety systems are configured to provide audible alerts in response to the presence of potential hazards, these audible alerts fail to adequately orient the driver, relying instead on driver confirmation of a location and a threat level of a potential hazard.

Accordingly, the present disclosure describes a method for providing three-dimensional stereo sound to a driver of a vehicle in order to spatially-alert the driver to a hazard, the alert being provided such that a threat level of the hazard along with other relevant characteristics of the hazard are communicated. In this way, the driver may be oriented to and made aware of a type of the hazard, a hazard location, and the threat level of the hazard, among others. In other words, a motivation of the present disclosure is to convince a driver, instinctually and as perceived by the auditory system of the driver, that a threat exist and exist in a specific direction relative to a vehicle operated by the driver.

As the auditory system has priority to the amygdala over other senses, including vision, and as the amygdala is involved with fear processing, providing an auditory warning is the most convincing way to alert a driver to looming threats and/or hazards. This can be appreciated in consideration of hazards which can be subsequently confirmed by visual cortices, wherein the auditory system 'primes' the human defense system to be alert to possible hazards.

Further to the above, it can be appreciated that looming sounds may be perceived as traveling faster than receding sounds. This trait of human hearing and perception allows incoming hazards to be perceived as closer than they physically are in reality. In this way, human hearing, when compared with human vision, allows for 'extra' time to react to an incoming hazard, as human hearing can be involuntarily engaged responsive to the hazard.

Accordingly, the present disclosure describes a method for providing three-dimensional stereo sound such that a possible hazard is spatially-perceived according to a determined severity of a threat level of the hazard and a location of the hazard. Detected hazards determined to have a high threat level may be conveyed to the driver by playback through an audio system and zoning matrix, the conveyance including a sound corresponding to the detected hazard that has been modified with synthesized effects such that the detected hazard appears closer to the driver, or which appears to be a traveling at faster speeds than in reality. The playback effect may also reflect the location of the hazard relative to the vehicle of the driver and enhance reaction time compared to sounds which appear to be stationary or further away.

In an embodiment, the present disclosure describes direct playback of external audio using spatially-relevant speakers within the cabin of the vehicle. For instance, during city driving, where there are several cyclists, pedestrians, construction vehicles, and the like, it may be beneficial to take the audio from microphones positioned around and outside the vehicle and play their signals directly inside the vehicle through loudspeakers that correlate to the location of the microphone from which the external audio was received. Audio received by an external microphone arranged to the rear and right of the vehicle may be played back through a loudspeaker arranged to the rear and right of the cabin of the vehicle.

According to an embodiment, the method of the present disclosure may be implemented in the context of a siren of an emergency vehicle. The siren of the emergency vehicle may be identified by an electronics control unit of a vehicle, via a microphone array positioned around an exterior of the vehicle, as a possible hazard. Using audio signals from the microphone array, the source angle and distance of the siren can be identified and, based on a type of the emergency vehicle, a recording of a similar siren corresponding to the type of the emergency vehicle can be reproduced within a cabin of the vehicle to acoustically-convey to a driver an angle and a distance from which the emergency vehicle is approaching. By precisely recreating the acoustics of the siren in three-dimensional stereo sound, the driver may be allotted adequate time to appropriately respond to the presence and travel vector, or travel direction, of the emergency vehicle. Such an example will be described in further detail with reference to FIG. 8.

According to an embodiment, the method of the present disclosure may be implemented in the context of a neighboring vehicle in a 'blind spot' of a driver of a vehicle. The neighboring vehicle may be identified by vehicle sensors and an auditory stimulus can be provided by an electronics control unit of the vehicle such that the presence of the neighboring vehicle is conveyed to the driver of the vehicle as a passing vehicle, amplified and spatially preserved in such a way as to convince the driver that the neighboring vehicle exists in their 'blind spot'. Therefore, the neighboring vehicle can be 'seen' acoustically without needing to be visually-observed.

The above-described embodiment can be further appreciated in view of prior approaches employing simple auditory stimuli, such as beeps, to warn a driver of the presence of a neighboring vehicle in their 'blind spot'. In order to understand more than the mere presence of the neighboring vehicle in their 'blind spot', these approaches require the driver to visually confirm the neighboring vehicle, thereby evaluating the level of threat posed by the neighboring vehicle. By implementing the methods of the present disclosure, however, spatial awareness can be provided to the driver and focus of the driver can remain on the road while having full comprehension of the level of threat posed by the neighboring vehicle present in their 'blind spot'. Such an example will be described in further detail with reference to FIG. 9.

According to an embodiment, the methods of the present disclosure can be performed by an electronics control unit of a vehicle and can be combined with other vehicle systems including, for instance, an in-car communication system. In an embodiment, the electronics control unit of the vehicle performs the methods of the present disclosure in coordination with remote processing circuitry configured to access peripheral devices, including servers, in order to process data from vehicle sensors and provide active safety to the driver of the vehicle.

According to an embodiment, the methods of the present disclosure, in communicating threat awareness to a driver of a vehicle, exploit the rapid cognitive abilities of the human auditory system. As hazards are detected by vehicle sensors including, in an example, cameras, microphones, LIDAR detectors, radar detectors, and the like, the hazards can be presented to the driver using spatial audio (i.e. three-dimensional stereo sound), thereby providing the driver with full context as to the type of hazard, a threat level of the hazard, an amount of time needed to react to the hazard, and a relative position, direction, and orientation (i.e. travel vector) of the hazard.

According to an embodiment, the methods of the present disclosure include the detection of hazards outside the vehicle and subsequent identification of the hazards as emergency vehicles, motorcycles, static obstacles, pedestrians, large animals, neighboring vehicles in 'blind spots', and the like. Once detected as hazards, each detected hazard can be identified using classifiers or correlations to determine their type and potential threat level to the driver. The detected and identified hazards can then be made known to a driver of the vehicle by audio representation of the hazard. This can be a direct reproduction of acoustics generated by the hazard, a pre-recorded or synthesized sound that corresponds to the detected hazard, or a modified reproduction of either, wherein the modification includes amplification or diminution by a spatial audio system to convey a relative location of the hazard and a severity of the threat level of the hazard. To this end, the reproduced sound can be played inside the vehicle in such a way as to spatially-mimic the detected and identified hazard.

According to an embodiment, the present disclosure describes a method for providing three-dimensional stereo sound, comprising receiving data signals from sensors positioned around an exterior of a vehicle, detecting a hazard based on the received data signals, determining characteristics of the detected hazard, generating, by processing circuitry, an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

According to an embodiment of the present disclosure, the method results in improved driver reaction times and elimination of the need for the driver to confirm a hazard by other senses.

Turning now to the Figures, the present disclosure will be described in view of exemplary embodiments. FIG. 1 is an illustration of a vehicle 101 including an in-car communication system 102. The vehicle 101 may include an electronics control unit (ECU) 160 configured to perform methods of the present disclosure in coordination with the in-car communication system 102, such as a method for providing three-dimensional stereo sound responsive to potential hazards. The ECU 160 may be in communication with and control of a plurality of microphones 106 of the vehicle 101 and a plurality of speakers 105 of the vehicle 101 in order to provide, in coordination with the in-car communication system 102, three-dimensional stereo sound to a driver 103 of the vehicle 101. Each of the plurality of microphones 106 of the vehicle 101 can be mounted throughout a cabin 108 of the vehicle 101, including within a headliner of the vehicle 101. As shown in the exemplary embodiment of FIG. 1, a plurality of passengers 104 can be in the vehicle 101, including the driver 103.

Under standard operation of the in-car communication system 102 of the vehicle 101, speech from each of the plurality of passengers 104 of the vehicle 101 can be enhanced and transmitted to each of the other passengers of the plurality of passengers 104 of the vehicle 101 to ensure that communication is not impeded and that all passengers have the opportunity to participate in vehicle conversation. To this end, spatial acuity of the enhanced and transmitted speech from each of the plurality of passengers 104 can be preserved such that, in an example, speech from a passenger in a rear of the vehicle is perceived by a driver in a front of the vehicle as if the voice is emanating from the rear of the vehicle.

As applied within the present disclosure, the in-car communication system 102 can be exploited to deliver audio to the driver 103 of the vehicle 101 in order to convey the presence and movement of potential hazards detected by vehicle sensors positioned around an exterior of the vehicle 101. In this way, the three-dimensional stereo sound, or spatial audio, provided by the ECU 160, via the in-car communication system 102, can be used to spatially-orient and convey a danger of a hazard to the driver 103 of the vehicle 101.

Figure 2:
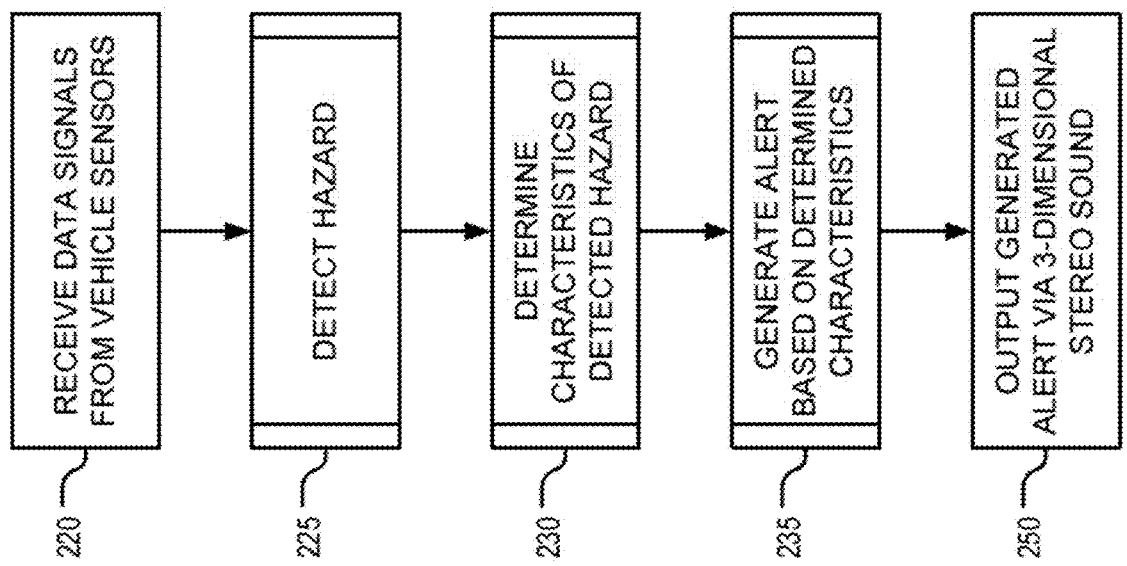
FIG. 2 is a flow diagram of a method for providing three-dimensional stereo sound, according to an exemplary embodiment of the present disclosure.

According to an exemplary embodiment, FIG. 2 provides a high-level flow diagram of a method for providing three-dimensional stereo sound, as introduced above.

At step 220, data signals from vehicle sensors can be received by an ECU of a vehicle. The vehicle sensors can be, as detailed in FIG. 3A, positioned around an exterior of the vehicle or can be positioned within the vehicle. The vehicle sensors positioned around the exterior of the vehicle can include microphones, cameras, and the like. It can be appreciated that only one type of vehicle sensor and, accordingly, one type of data signal is needed in order to perform the methods of the present disclosure. Multiple data signals may, however, be used in an embodiment order to account for variability in vehicle sensor reliability and vehicle sensor confidence levels.

Data signals received from the vehicle sensors can be evaluated to determine a possible presence of a hazard. At sub process 225, the received data signals can be evaluated to determine if a hazard is present. If a hazard is detected in the data signals received from the vehicle sensors, as a deviation from an expected data signal, the received data signals corresponding to the detected hazard are then further evaluated, as will be explained in further detail with reference to FIG. 4.

At sub process 230, the received data signals corresponding to the detected hazard can be further evaluated to determine characteristics of the detected hazard. Such characteristics can include a hazard type, a hazard location, a travel vector (i.e., speed, direction), and a threat level of the hazard determined therefrom. Through an understanding of the above-described determined characteristics of the detected hazard, the ECU can generate an appropriate alert to convey these characteristics to a driver of the vehicle. Sub process 230 will be described in greater detail with reference to FIG. 5A through FIG. 5E.

Having determined the characteristics of the detected hazard, an alert can be generated at sub process 235. The generated alert can be a spatially-orienting alert that indicates to the driver, without the need for visual confirmation, that a hazard is located in a particular direction and is moving in a particular direction with a particular speed. For instance, the generated alert may be produced from a left rear speaker of the vehicle when the hazard is detected in a relative position that is left and rear of the vehicle. The generated alert can also be a sound that is a direct reproduction of a sound created by the detected hazard, a recording of a sound created by the detected hazard, or another sound corresponding to the detected hazard and meant to indicate the type of hazard, as will be described with reference to FIG. 7. Additionally, the generated alert can be a sound that is modified in order to convey a threat level of the detected hazard. For instance, if the detected hazard is of high threat level, the generated alert can be a looming sound to indicate a severity of the detected hazard and in order to provide the driver with adequate time to respond to the detected hazard. Alert generation will be discussed in greater detail with reference to FIG. 6A.

At step 250, the generated alert can be output to the driver of the vehicle, by the ECU, in three-dimensional stereo sound via the in-car communication system. The outputted alert can spatially-orient the driver to the detected hazard and convey, simultaneously, a type and threat level of the detected hazard. Such outputting of the generated alert will be discussed in greater detail with reference to FIG. 6B and FIG. 6C.

Figure 3A:
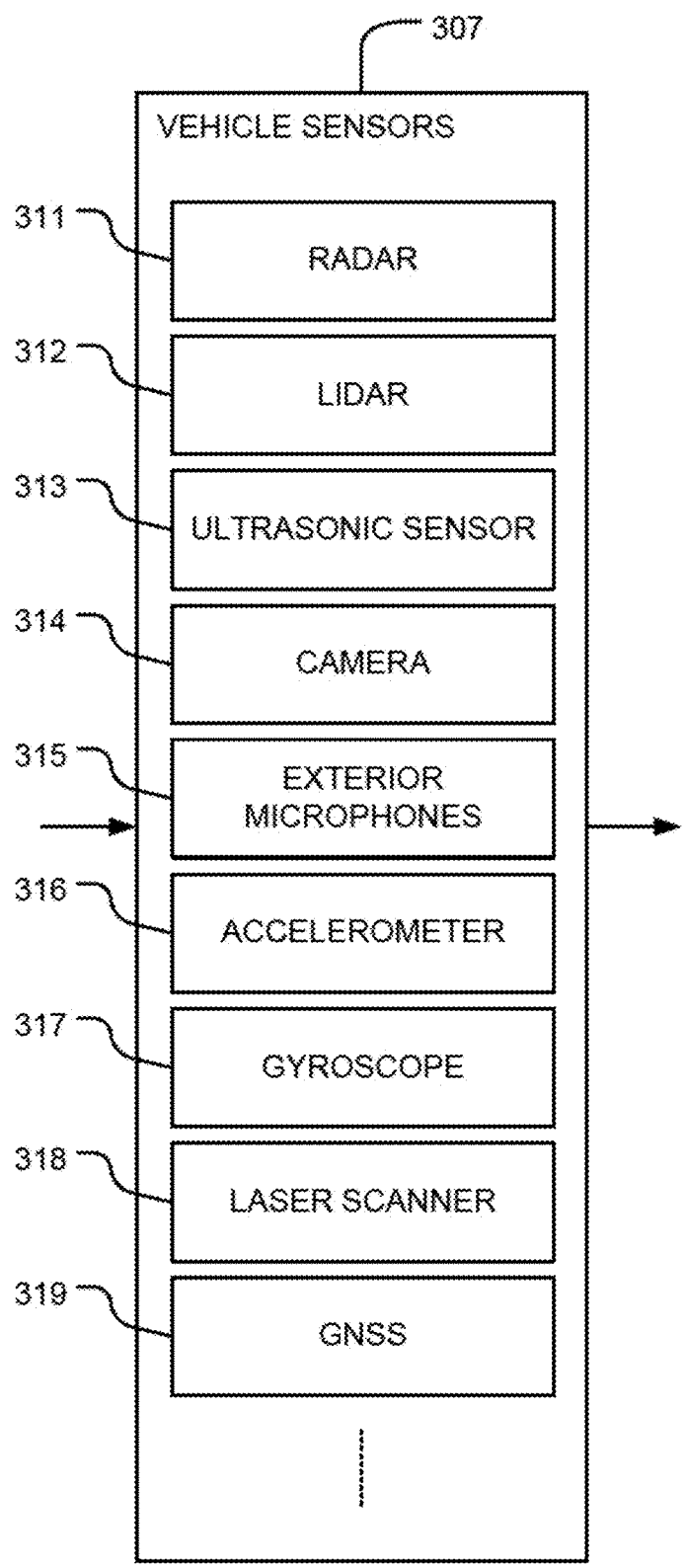
FIG. 3A is a schematic of vehicle sensors of a vehicle, according to an exemplary embodiment of the present disclosure.

Having introduced methods of the present disclosure, with reference to FIG. 2, each step and sub process of the method will now be described in greater detail. Turning first to FIG. 3A, data signals received at step 220 may be received from vehicle sensors 307. In an example, the vehicle sensors 307 may be positioned around an exterior of the vehicle in order to capture an external environment of the vehicle, including any potential hazards that may exist. These vehicle sensors 307 may include radar(s) 311, LIDAR (S) 312, ultrasonic sensor(s) 313 (i.e., sonar(s)), camera(s) 314, exterior microphone(s) 315, and laser scanner(s) 318. In an embodiment, a portion of the exterior microphone(s) 315 may form a microphone array and may be configured to perform direction of arrival evaluations. Each of the microphones may be an omnidirectional microphone, a unidirectional microphone, a bi-directional microphone, and the like, as appropriate. The radar(s) 311 and LIDAR(s) 312 may be used to determine medium- to long-range distances to potential hazards. The sonar(s) 313 may be used to determine short-range distances to potential hazards (e.g. neighboring vehicles in drive 'blind spots'). The camera(s) 314 may be used for distancing as well as for identification of potential hazards such that appropriate alerts may be generated. The laser scanner(s) 318 may be used to acquire a map of the external environment of the vehicle, allowing for, inter alia, detection of motorcycles, pedestrians, static obstacles, and the like. In an example, the vehicle sensors 307 may include sensors positioned around an interior of the vehicle and may be configured to integrate with the vehicle sensors 307 positioned around the exterior of the vehicle in order to provide context and determine characteristics of detected hazards. These vehicle sensors 307 may include, as examples, accelerometer(s) 316, gyroscope(s) 317, and other similar devices associated with inertial movement units, as well as global position system receiver(s), such as a Global Navigation Satellite System (GNSS) 319 receiver for determining a geographic location of the vehicle.

Figure 3B:
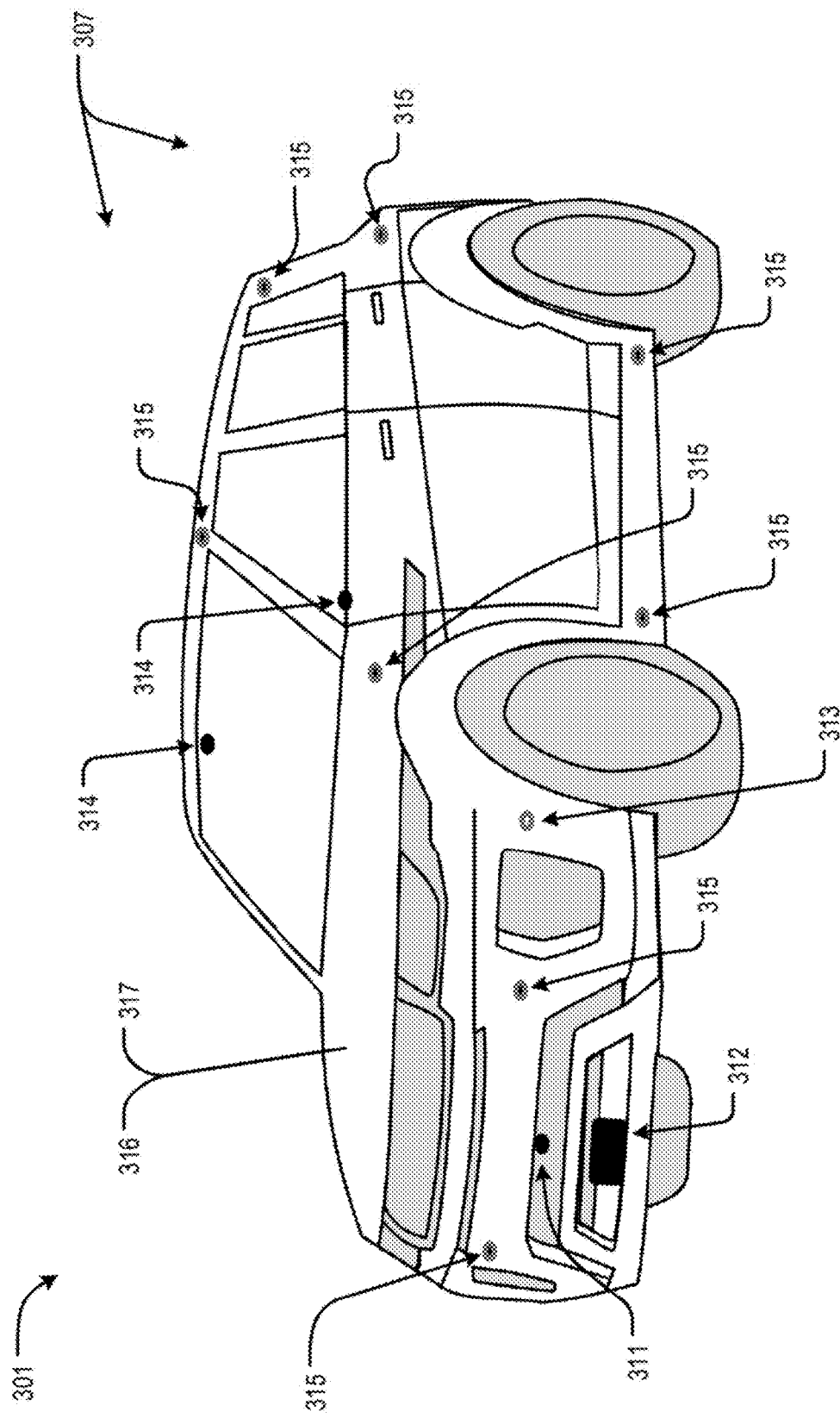
FIG. 3B is an illustration of vehicle sensors on an exterior of a vehicle, according to an exemplary embodiment of the present disclosure.

The vehicle sensors positioned around the exterior of the vehicle may be arranged as in the exemplary illustration of FIG. 3B. A vehicle 301 may be outfitted with a plurality of vehicle sensors 307 including one or more cameras 314, one or more LIDARs 312, one or more radars 311, a plurality of ultrasonic sensors 313, and a plurality of microphones 315. In an example, one or more of the plurality of vehicle sensors 307 can be positioned behind a wheel well of the vehicle. Further, one or more of the plurality of vehicle sensors 307 may be positioned on an internal surface of an exterior metal shell of the vehicle 301 in order to capture acoustic inputs (e.g. speech, sirens, approaching vehicles) without the impact of wind contamination, water, ice buildup and the like. Vehicle sensors 307 may also be positioned around an interior of the vehicle 301, the vehicle sensors 307 including one or more accelerometers 316 and one or more gyroscopes 317 configured to integrate with the vehicle sensors 307 positioned around the exterior of the vehicle 301 to provide contextual information regarding data signals generated by the vehicle sensors 307 and received by an ECU of the vehicle 301. Moreover, the types of vehicle sensors are not limited to those described above and may include, among others, piezoelectric transducers.

Figure 4:
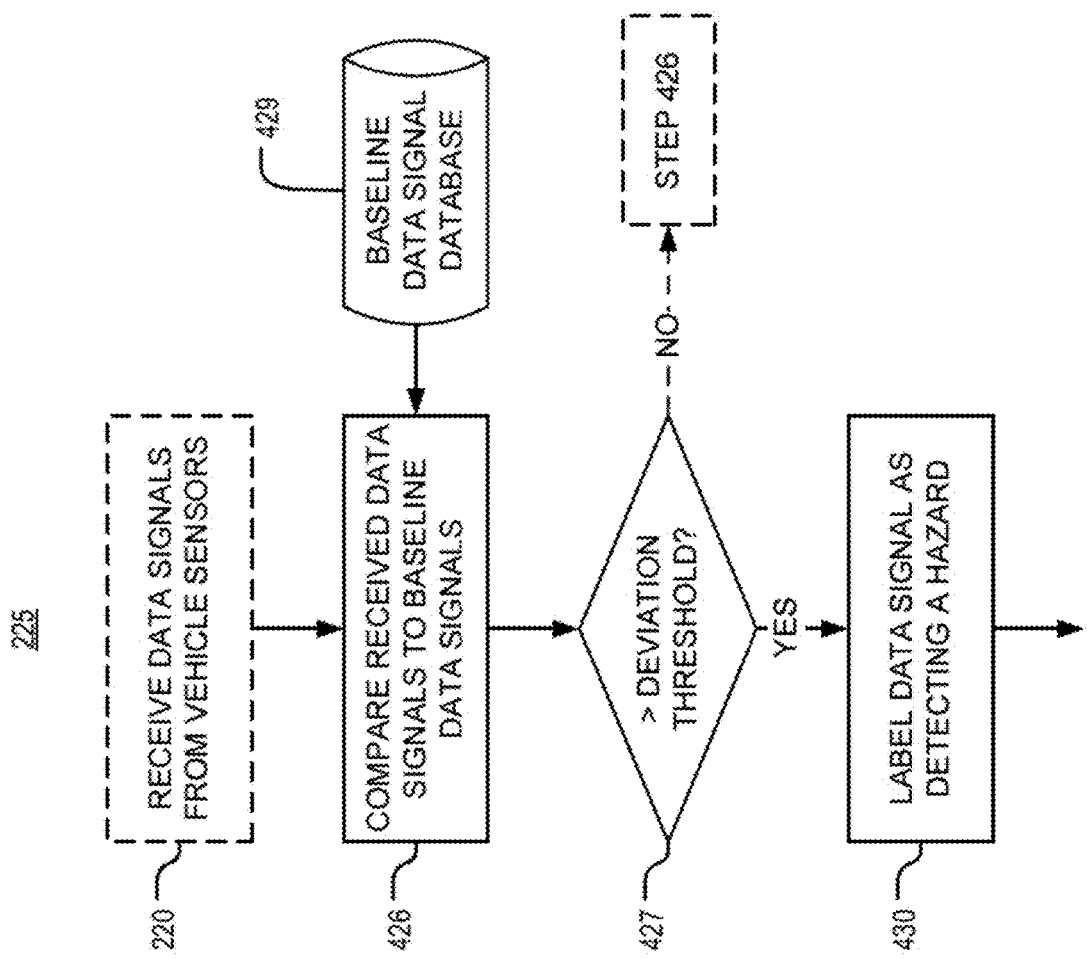
FIG. 4 is a flow diagram of a sub process of a method for providing three-dimensional stereo sound, according to an exemplary embodiment of the present disclosure.

As an implementation of the vehicle sensors 307 of FIG. 3A and FIG. 3B, sub process 225 is described in an exemplary embodiment with reference to FIG. 4, wherein data signals from the vehicle sensors 307 are received by an ECU of the vehicle 301.

At step 426 of sub process 225, and having received data signals from vehicle sensors at step 220, the received data signals can be compared to baseline data signals from a baseline data signal database 429 to identify deviations from expected data signals. The baseline data signal database 429 may be local to the vehicle or may be accessible via wireless communication with a remote, cloud-computing environment. The baseline data signals may be data signals acquired under normal conditions and may correspond to a respective vehicle sensor type of the plurality of vehicle sensors. Moreover, and to reduce the processing burden of processing circuitry of the ECU, a time-average of the received data signals can be calculated. The time-average can be performed over time intervals appropriate to provide sufficient granularity that hazards may be detected. For instance, the time intervals may be one second, two seconds, or five seconds. The time-averaged data can be compared with similarly truncated data from the baseline data signal database 429 to identify deviations that may be indicative of hazards. Time-averages may also mitigate the impact of noise introduced to the data signal.

In an embodiment, the comparison at step 426 of sub process 225 can be performed for data signals received from each vehicle sensor of a vehicle. Each vehicle sensor may be associated with a confidence level. Accordingly, in an embodiment, the comparison at step 426 of sub process 225 may be performed for a signal(s) received from each vehicle sensor, the data signal(s) being adjusted based on a respective confidence level of each vehicle sensor. A combined deviation score may be generated therefrom, thereby accounting for possibly errant values, and the comparison at step 426 of sub process 225 may be between the combined deviation score and a baseline combined deviation score.

In an embodiment, the comparison at step 426 of sub process 225 may be performed for a data signal received from a single vehicle sensor having a maximal confidence level amongst the vehicle sensors. In an example, the data signal may be a data signal from a microphone of a microphone array.

Accordingly, at step 427 of sub process 225, it can be determined if the received data signals are significantly different from a respective baseline data signal acquired from the baseline data signal database 429. If it is determined that a value of deviation of the received data signal, from the respective baseline data signal, is less than a predetermined deviation threshold, it can be determined that no hazard is present and sub process 225 returns to step 426. Alternatively, if it is determined that a value of deviation of the received data signal, from the respective baseline data signal, is greater than a predetermined deviation threshold, it can be determined that a hazard is present and sub process 225 proceeds to step 430. In an embodiment, the determination at step 427 of sub process 225 is performed for only the vehicle sensor having the maximal confidence level. In another embodiment, the determination at step 427 of sub process 225 is performed for an adjusted data signal from each vehicle sensor of the vehicle. In this case, if a majority of vehicle sensors satisfy the predetermined deviation threshold at step 427 of sub process 225, it can be determined that a hazard is present and sub process 225 proceeds to step 430.

At step 430 of sub process 225, the received data signal(s) corresponding to the detected hazard can be labeled as including a detected hazard and can be further processed according to the methods of sub process 230, described in FIG. 5A through FIG. 5E.

Figure 5A:
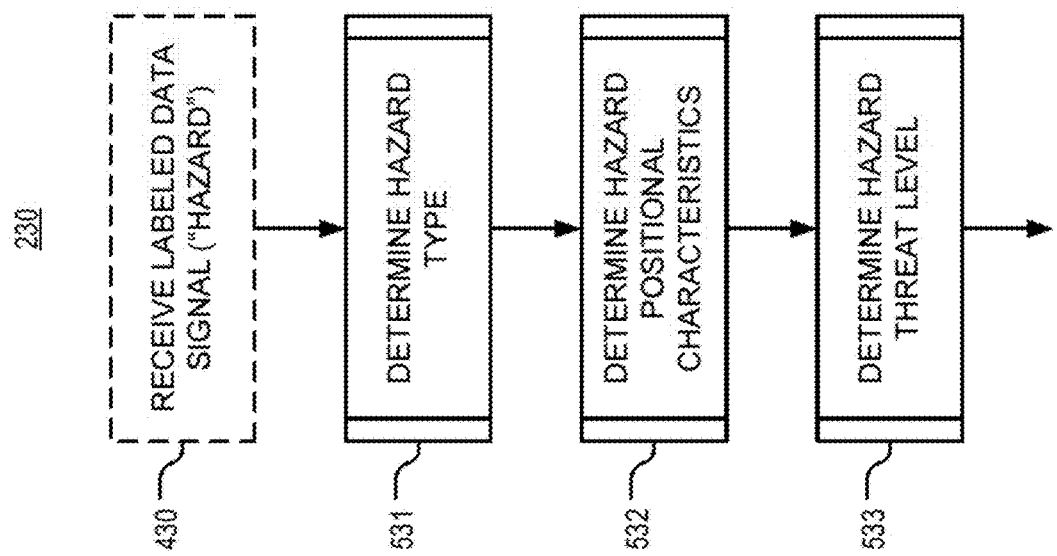
FIG. 5A is a flow diagram of a sub process of a method for providing three-dimensional stereo sound, according to an exemplary embodiment of the present disclosure.

According to an exemplary embodiment, FIG. 5A is a flow diagram describing sub process 230 wherein characteristic features of the detected hazard can be determined. In an example, the characteristic features of the detected hazard can be determined by a combination of at least one feature extraction model that considers confidence levels of vehicle sensors in context of environmental constraints.

Figure 5B:
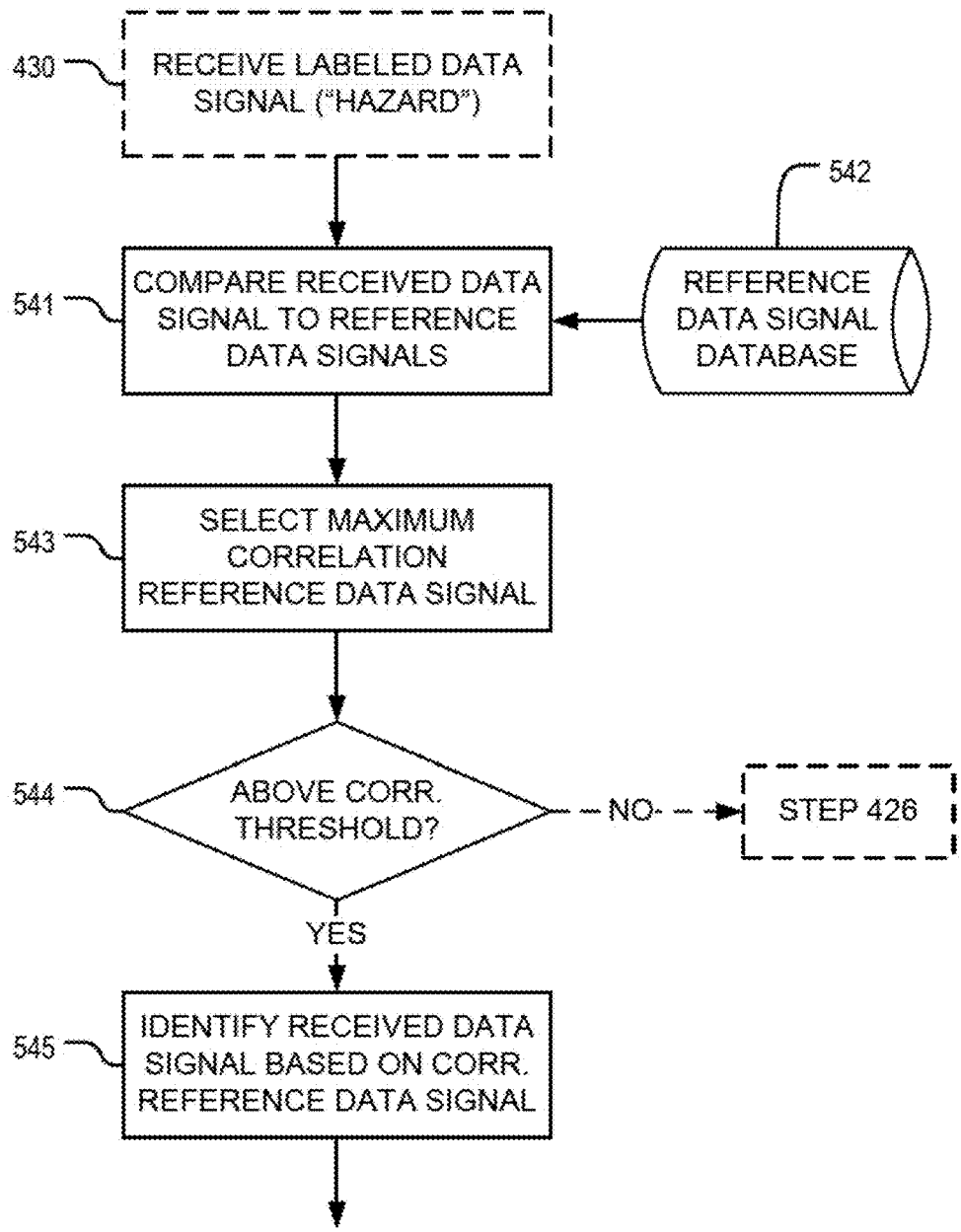
FIG. 5B is a flow diagram of a sub process of a method for providing three-dimensional stereo sound, according to an exemplary embodiment of the present disclosure.

At sub process 531 of sub process 230, the data signal(s) labeled at step 430 as a detected hazard can be received by the ECU and a type of the detected hazard can be determined, as described in FIG. 5B. The received data signal(s) associated with the detected hazard can be compared with a reference data signal database to identify a highly correlated reference data signal. The type of the detected hazard may be identified according to the type of hazard associated with the highly correlated reference data signal. In an embodiment, identification can be performed by implementation of classifiers trained to label received data signals according to signatures associated with known hazards.

According to an embodiment, the received data signal(s) can be associated with one of a plurality of vehicle sensors and the identity of the type of hazard can be confirmed by additional analysis of another one or more of the plurality of vehicle sensors. Having identified the type of hazard detected, one or more positional characteristics of the hazard may be determined at sub process 532 of sub process 230, as shown in FIG. 5D. The one or more positional characteristics may be used to spatially-orient the driver to the detected hazard and can include a position of the detected hazard, a travel vector of the detected hazard, and a time required for driver reaction to the detected hazard, among others. The travel vector of the detected hazard can be a vector indicating a speed and direction at which the detected hazard is moving so that its position relative to the vehicle operated by the driver can be determined. At sub process 533 of sub process 230, a threat level of the hazard can be determined. This determination can be based partly on the determined hazard type (sub process 531 of sub process 230) and the determined positional characteristics of the hazard (sub process 532 of sub process 230). Considered on the whole, the determination of the threat level of the hazard can be based on the probability that a travel vector of the hazard and a travel vector of the vehicle operated by the driver may result in the path of the hazard intersecting with the path of the vehicle. In this way, a severity of the threat level of the hazard can instruct the ECU as to when and how the driver of the vehicle should be alerted in order to ensure that the driver has sufficient awareness and time to respond to the hazard. Discussed later, the characteristics of the detected hazard determined at sub process 230 can be provided to the ECU in order to generate a concordant alert at sub process 235.

According to an embodiment, FIG. 5B provides a flow diagram describing methods of sub process 531 of sub process 230 of the methods of the present disclosure, wherein the received data signal(s) of the detected hazard can be identified by comparison with a reference data signal.

At step 541 of sub process 531, the data signal(s) labeled as hazard and received at step 430 can be compared with reference data signals acquired from a reference data signal database 542. The reference data signal database 542 may be local to a vehicle or may be accessible via wireless communication with a remote, cloud-computing environment. Each of the reference data signals of the reference data signal database 542 may be associated with a type of hazard. The type of hazard may be one of a group of hazards including, among others, emergency vehicles, neighboring vehicles, passing vehicles, animals, pedestrians, and cyclists. The comparison of the data signal associated with the detected hazard and each of the reference data signals of the reference data signal database can be a correlation therebetween.

In an embodiment, the above-described processing can be performed locally to the vehicle or remotely via cloud-computing environment and can be based on the computational intensity of the processing and an anticipated time to hazard and driver reaction times. For instance, if the detected hazard is in close proximity to the vehicle, cloud-computing may not provide the rapid evaluation needed in order to allow time for response by a vehicle operator. Moreover, it can be appreciated that certain classifiers require longer to process than others and threat-detection latency times may exceed driver reaction time requirements, thus rendering the detection useless. In this way, certain vehicle sensors may be excluded from further consideration if it is determined that a respective processing is not of value.

In other words, computationally-intensive processes, such as image-based semantic image segmentation, may introduce latencies that are impracticable in real-time, and as such, correlations from these processes may not be considered in the identification and localization of the hazard. Alternatively, if is determined that processes can be performed within a given time period appropriate for driver reaction, for example, respective correlations may be considered in the identification and localization of the hazard.

For simplicity, step 541 of sub process 531 will be assumed to have been performed in view of one data signal from one vehicle sensor, though further discussion of instances where multiple data signals are considered will follow. Thus, according to an embodiment, at step 543 of sub process 531, a correlation between the data signal and the reference data signals of the reference data signal database having a maximal correlation value can be selected as a likely identity of the detected hazard.

At step 544 of sub process 531, the correlation value of the selected correlation can be compared to a predetermined correlation value threshold to determine if the identity of the detected hazard is reliable. If it is determined that the correlation value of the selected correlation is below the predetermined correlation value threshold, sub process 531 can return to step 426 of the methods of the present disclosure. It may be that the detected hazard is a false positive, a result of inaccuracies of a specific type of vehicle sensor in certain external environment conditions. Alternatively, it may be that the detected hazard is of an unknown hazard type. In this case, the reference data signal database 542 may be expanded to include additional types of previously unknown hazards. Alternatively, if it is determined that the correlation value of the selected correlation is above the predetermined correlation value threshold, the identity of the detected hazard is determined to be that which is associated with the correlated reference data signal. Accordingly, at step 545 of sub process 531, the received data signal associated with the detected hazard can be identified as representative of the type of hazard associated with the correlated referenced data signal.

In an embodiment, identification of the hazard type, as described above with respect to FIG. 5B, can be performed by implementation of one or more classifiers trained to identify signatures of hazards within received data signals. Such classifiers can be trained according to known machine learning methods including, for example, support vector machines, wherein a received data signal can be classified as matching a signature of a known hazard. It can be appreciated that a similar approach can be implemented with reference to FIG. 5E, wherein classifiers may be trained to determine a threat level of a hazard based on a type of hazard and positional characteristics of the hazard.

Figure 5C:
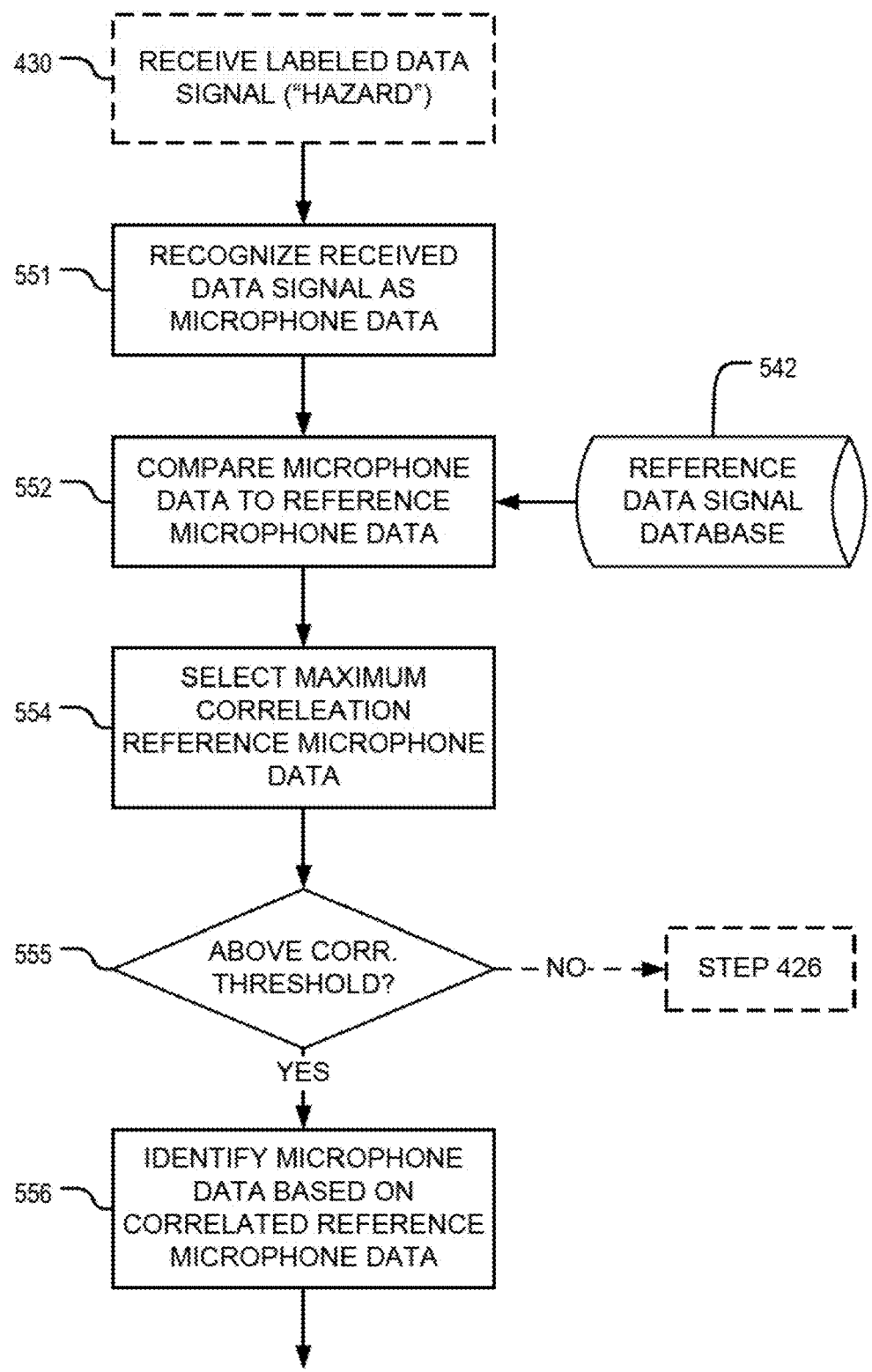
FIG. 5C is a flow diagram of a sub process of a method for providing three-dimensional stereo sound, according to an exemplary embodiment of the present disclosure.

The generally-described flow diagram of FIG. 5B is described with reference to FIG. 5C as being implemented within an exemplary, single data signal type. At step 551 of sub process 531' (analogous to sub process 531 described in FIG. 5B), a data signal received at step 430 and labeled as a detected hazard can be recognized as being data received from an array of microphones positioned around an exterior of a vehicle. Accordingly, at step 552 of sub process 531', the microphone data signal can be compared to reference microphone data signals acquired from a reference data signal database 542. In an example, the reference microphone data signals of the reference data signal database 542 can include data signals corresponding to specific types of hazards. The data signals may be, in an example, acoustic signals associated with different sirens used by ambulance, police vehicles, and fire department vehicles. The data signals may be, in an example, acoustic signals associated with neighboring vehicles, or passing vehicles, and may reflect the changing acoustic fingerprint or characteristics of a passing vehicle. The comparison may be, as in step 541 of sub process 531, a correlation between the microphone data signal and each of the reference microphone data signals acquired from the reference data signal database 542. A maximum correlation value of the microphone data signal and a reference microphone data signal can be selected at step 554 of sub process 531'. If it is determined, at step 555 of sub process 531', that the selected correlation value is below a predetermined correlation value threshold, sub process 531' returns to step 426 of the methods of the present disclosure. In another embodiment, when the selected correlation value is below the predetermined correlation value threshold, sub process 531' may additionally evaluate data signals received from other ones of a plurality of vehicle sensors in order to confirm the identity of the hazard. To this end, a data signal from cameras of the plurality of vehicle sensors may be used to confirm the identity of the hazard as determined based on the data signal received from the microphones of the microphone array. Alternatively, and returning to step 555 of sub process 531', if it is determined that the selected correlation value is above the predetermined correlation value threshold, sub process 531' proceeds to step 556, wherein the received microphone data signal labeled as a detected hazard can be confidently identified as and associated with the type of hazard associated with the reference microphone data signal of the reference data signal database 542. In an example, the detected hazard may be confidently identified as a siren of an ambulance.

Concurrently, positional characteristics of the detected hazard may be determined in sub process 532, described with reference to the exemplary flow diagram of FIG. 5D.

At step 581 of sub process 532, a position and a travel vector of the detected hazard can be determined based on the data signal associated with the detected hazard and received at step 430. In an embodiment, assuming the data signal used for detection of the hazard was acquired by a single sensor of a plurality of vehicle sensors, the position and travel vector of the detected hazard can be determined according to the received data signal and/or in coordination with data signals received from one or more of the remaining vehicle sensors 582 of the plurality of vehicle sensors. For instance, while a data signal received from microphones of a microphone array may be the sole basis for detection of a hazard, the microphone data signal may be supplemented by data signals from radar, LIDAR, accelerometers, gyroscopes, and combinations thereof, in determining the position and the travel vector of the detected hazard. According to an embodiment, a position of a detected hazard may be determined by ranging techniques such as radar and LIDAR, and the travel vector of the detected hazard may be determined by continuous measurement via radar and LIDAR and by integration of camera signals in which the detected hazard has been identified via image classification or similar approach.

At step 583 of sub process 532, a time required for driver reaction to the detected hazard can be determined based on the determined position of the detected hazard and the determined travel vector of the detected hazard. These determinations can be supplemented by additional data from the plurality of vehicle sensors 584. In an embodiment, the determined time for reaction may be an estimation of the time required for a driver of a vehicle to be made aware of, respond to, and avoid the detected hazard. To this end, the determined time for reaction may be based on an estimation of when a travel path of the detected hazard may intersect a travel path of the vehicle operated by the driver. In determining this length of time, an alert can be generated at sub process 235 such that the driver is given extra time to respond, if necessary.

Figure 5E:
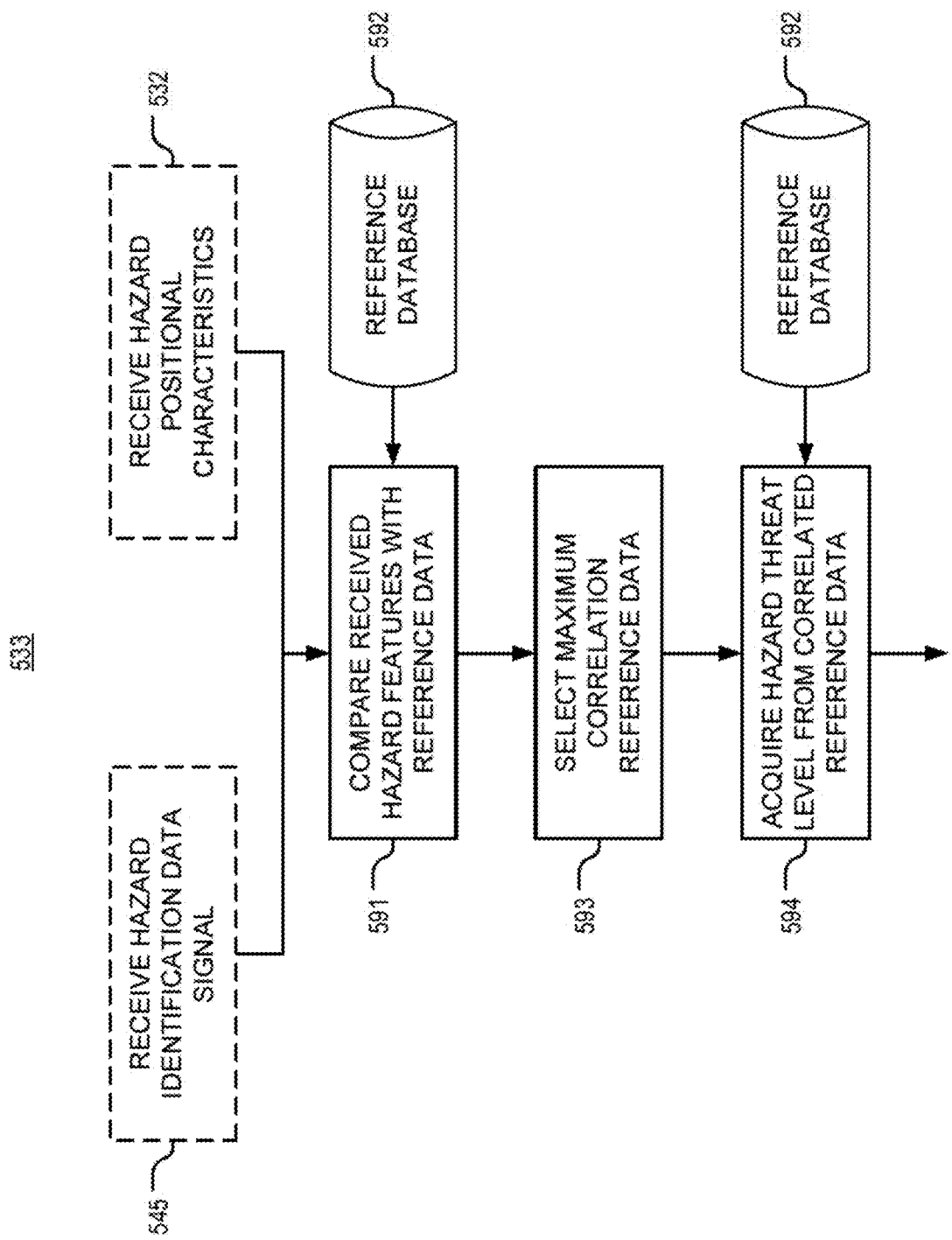
FIG. 5E is a flow diagram of a sub process of a method for providing three-dimensional stereo sound, according to an exemplary embodiment of the present disclosure.

Having determined the identity of the detected hazard and the positional characteristics of the detected hazard, a threat level of the detected hazard can be determined at sub process 533 of sub process 230. FIG. 5E provides an exemplary flow diagram of a sub process for determining a threat level of the detected hazard.

Initially, a hazard identification data signal 545 and hazard positional characteristics 532 can be received as received hazard features data. Then, at step 591, the received hazard features data can be compared with reference hazard features data of a reference database 592 to determine a relationship between the type of hazard, the position of the hazard, the travel vector of the hazard, and a requisite driver reaction time to the hazard in order to determine a corresponding threat level of the hazard. The comparison may be a correlation between the received hazard features data and the reference hazard features data of the reference database 592. The reference database 592 may be a database wherein combinations of hazard types and positional characteristics of the hazard are labeled according to a corresponding threat level severity. For instance, an exemplary entry in the reference database may be, as a hazard type, a police officer, and as a travel vector of the positional characteristics of the hazard, a high speed movement perpendicular to and toward a path of travel of a vehicle operated by a driver. The 'police officer' and the 'high speed movement perpendicular to and toward a path of travel of a vehicle of a driver' can be labeled as a high severity threat level. It can be appreciated, however, that the threat level severity may be evaluated on any scale suitable to convey, with appropriate granularity, a severity of a threat posed by a hazard.

In an embodiment, the comparison of the received hazard features data and the reference hazard features data of the reference database 592, performed at step 591 of sub process 533, can be a comparison of the received hazard features data and a plurality of reference hazard features data of the reference database 592. Accordingly, at step 593 of sub process 533, a maximum correlation between the received hazard features data and reference hazard features data of the reference database 592 can be selected. Understanding that each entry of reference hazard features data in the reference database 592 is labeled as, or corresponds to, a threat level severity, a threat level severity can be assigned to the received hazard features data based on the selected correlation. To this end, a threat level of the hazard associated with each reference hazard features data entry in the reference database 592 can be acquired from the reference database 592 at step 594 of sub process 533 and assigned to the received hazard features data.

It can be appreciated that sub process 225 and sub process 230 are described, primarily and for simplicity, from the perspective of a single type of vehicle sensor. However, according to an embodiment of the present disclosure, signals received from a plurality of vehicle sensors may be considered in determining the presence of a hazard and, subsequently, a type and positional characteristics thereof. To this end, variable reliability and confidence levels of the plurality of vehicle sensors, which may change based on vehicle parameters and/or external weather conditions, may be accounted for when determining parameters related to a potential hazard.

As it relates to sub process 230, data signals may be received from a plurality of vehicle sensors. Sub process 531 of sub process 230 may consider data signals from the plurality of vehicle sensors and respective reliabilities, thereof. For instance, at step 541 of sub process 531, data signals received from each of the plurality of vehicle sensors may be compared to reference data signals from the reference data signal database 542. Appreciating that each of the vehicle sensors may be variably impacted by external factors such as vehicle speed, ambient light, and weather conditions, step 541 of sub process 531 may consider variable reliability levels of the vehicle sensors.

According to an embodiment, the comparison can include a risk assessment/classifier reliability matrix that can influence a correlation value by assigning a value multiplier. The value multiplier may be based on historical data, actuarial sciences, and the like, and may reflect a risk of incorrectly identifying a hazard type and a reliability of a vehicle sensor in context of certain real-time, external factors. Vehicle sensors that are higher risk and/or less reliable in a given condition may be assigned a value multiplier greater than one, while low risk vehicle sensors and/or more reliable vehicle sensors in a given condition may be assigned a value multiplier between 0 and 1. In an embodiment, the risk assessment/classifier reliability matrix may incorporate a confidence level of each vehicle sensor as influencing the value multiplier.

In an embodiment, the risk assessment/classifier reliability matrix may be implemented by element-wise multiplication during step 541 of sub process 531. In other words, a correlation matrix resulting from comparing each received data signal to each reference data signal in a reference data signal database can be multiplied by the risk assessment/classifier reliability matrix. The correlation matrix may include rows and columns, wherein each row is a classifier of a vehicle sensor type, each column is a hazard type, and an entry within the correlation matrix is an initial correlation value assigned based on the comparison between the data signal received from the vehicle sensor and the reference data signal corresponding to the given hazard.

Element-wise multiplication of the risk assessment/classifier reliability matrix and the correlation matrix results in a matrix having an adjusted correlation value in each cell of the matrix. In an embodiment, step 541 of sub process 531 may proceed to step 543 and a maximally correlated cell of the matrix may be selected for further processing. In another embodiment, adjusted correlation values within a given column can be summed to determine a combined total score for a hazard type, the combined total score accounting for adjusted correlations from each of the vehicle sensors. Then, the combined total score for the hazard type can be compared to a combined total score threshold. In an embodiment, an adjusted correlation value and Boolean result can be presented for each of the vehicle sensor types. In this way, it is possible to assess how combinations of the adjusted correlation scores across multiple sensors can influence a confidence with which a hazard type is identified. Such analysis may be performed by Kalman filtering, Baysian statistical approaches, and the like.

According to the embodiment, the above-described risk assessment/classifier reliability matrix may be based, in part, on roadway conditions that change in real-time. For instance, values for each cell of the risk assessment/classifier reliability matrix reflect a reliability of a vehicle sensor in context of real-time external factors such as vehicle speed, ambient light, and weather. It can be appreciated, for example, that vehicle speed is inversely proportional to the required driver reaction time, and microphone data, depending on a location of the microphone, can corrupt with increasing vehicle speed. Further, an increasing vehicle speed can introduce wind artifacts, and an increasing noise field from a host vehicle can impede and/or mask noises captured by microphones of neighboring vehicles. It can also be appreciated that lower levels of ambient light may introduce higher levels of noise in camera images, which will limit detection accuracy for some hazards. Higher levels of ambient light may lead to lower contrast, more lens flaring, and lower dynamic range. Also, it can be appreciated that adverse weather events can negatively impact imaging abilities and/or audio capturing abilities. Certain sensors, including cameras, can suffer lower visibility during these events, and rain, in particular, increases the volume of tire/road noise, further limiting the detection accuracy and/or scope of microphones. In an embodiment, values for each cell of the risk assessment/classifier reliability matrix may also reflect required processing time. Certain classifiers require longer to process than others. In this way, hazard-detection latency times may exceed driver reaction time requirements, rendering the detection of no value. These latency times can also be impacted by a speed and threat level of the hazard. Moreover, at the same time cloud-computing process are not fast enough, bandwidth of local processing may be too limited for certain classifiers, rendering certain vehicle sensors useless.

Figure 6A:
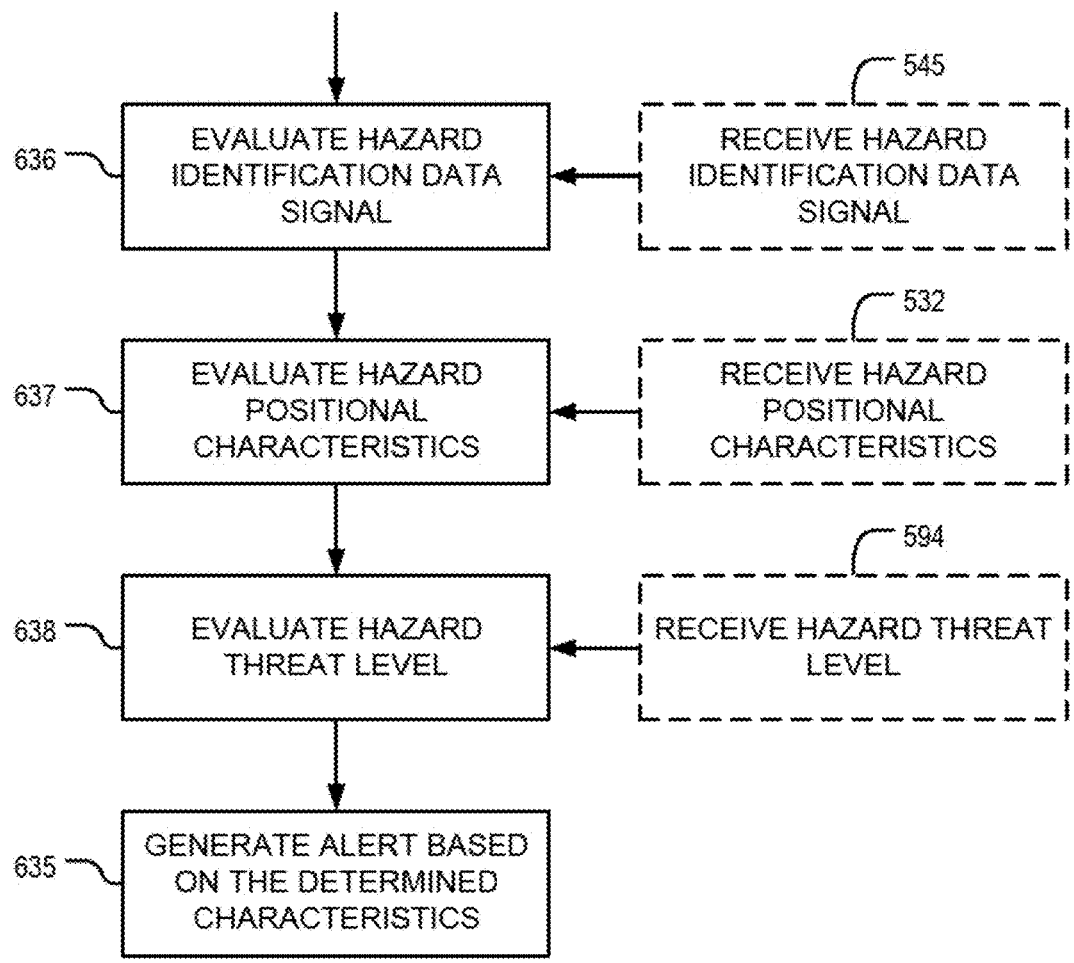
FIG. 6A is a flow diagram of a sub process of a method for providing three-dimensional stereo sound, according to an exemplary embodiment of the present disclosure.
Figure 7:
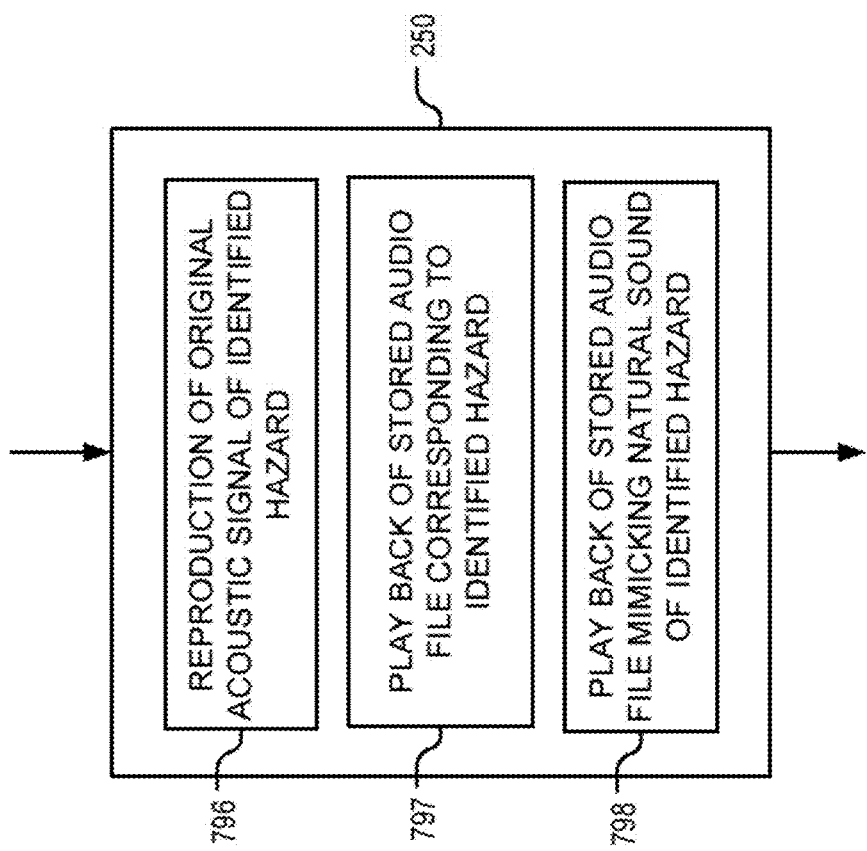
FIG. 7 is a flow diagram of a sub process of a method for providing three-dimensional stereo sound, according to an exemplary embodiment of the present disclosure.

Turning now to FIG. 6A, the hazard features data of FIG. 5A through FIG. 5E, including the type of hazard, the positional characteristics of the hazard, and the threat level of the hazard can be evaluated in order to generate an alert to the driver of the vehicle at sub process 235. To this end, each of the hazard features data can be evaluated, as described below, in order to determine a corresponding alert that should be generated to notify the driver of the vehicle of the hazard, as will be described with reference to FIG. 7.

At step 636 of sub process 235, a received hazard identification data signal 545, or type of hazard, can be evaluated. Through evaluation of the received hazard identification data signal 545, a type of alert to be provided to the driver of the vehicle can be determined. In an embodiment, the type of alert can be a direct reproduction of a sound of the identified hazard as acquired by microphones positioned around an exterior of the vehicle. In an embodiment, the type of alert can be a reproduction of a pre-recorded sound that mimics a natural sound of the identified hazard. In an embodiment, the type of alert can be another sound corresponding to the identified hazard that may be understood by the driver of the vehicle.

At step 637 of sub process 225, received hazard positional characteristics 532 can be evaluated. Through evaluation of the received hazard positional characteristics 532, the type of alert identified at step 636 may be modified in order to control perception of the alert by the driver. To this end, the three-dimensional stereo sound of the in-car communication system can be exploited to orient the driver to the alert in a controlled manner. In an embodiment, and assuming a known location, a known travel vector, and a known requisite driver reaction time concordant with the received data signal, the alert can be generated in order to orient driver such that the audio playback is perceived to be coming from the known direction with a known movement and at a time sensitive to the requisite driver reaction time.

At step 638 of sub process 225, a received hazard threat level 594, or threat level severity, can be evaluated. Through evaluation of the received hazard threat level 594, an amplification or diminution of the alert can be determined to be appropriate. For instance, if a detected and identified hazard is determined to have a high threat level, it may be appropriate for the generated alert to be amplified in order to attract the attention of the driver of the vehicle and to convey the severity of the threat level posed by the hazard. Alternatively, if the detected and identified hazard is determined to be of low threat level, it may be appropriate for a diminuendo generated alert in order to convey a relative lack of concern for the hazard. In an example, as will be described with reference to the examples of FIG. 6B and FIG. 6C.

According to an embodiment, the above evaluations can be performed at step 636, step 637, and step 638 of sub process 225 in order to allow for generation of an alert based on the determined characteristics at step 635. To this end, FIG. 6B and FIG. 6C provide exemplary flow diagrams of the evaluations of the above-described steps of sub process 225, wherein a hazard has been detected and identified and the hazard type, hazard positional characteristics, and hazard threat level can be evaluated to determine how an alert should be generated.

According to an exemplary embodiment, and with reference to FIG. 6B, sub process 225 may generate an alert based on determined characteristics of the hazard. As in FIG. 6B, the hazard type evaluated at step 636 of sub process 225 may be a pedestrian, positional characteristics of the hazard evaluated at step 637 of sub process 225 may indicate the hazard is positioned to the front right of the vehicle and is traveling perpendicularly to and toward the vehicle, and the threat level of the hazard evaluated at step 638 of sub process 225 may be determined to be of high severity. It can be appreciated that, although a walking pedestrian typically does not generate an audible sound directly perceptible by the driver of the vehicle, the ECU of the vehicle may nonetheless produce a sound mimicking a sound of the walking pedestrian or may generate another sound corresponding to the walking pedestrian such that the driver of the vehicle understands and appreciates that the hazard is a walking pedestrian. Alternatively, in higher threat situations involving pedestrians, pre-recorded voices and/or sentences can be played over the audio system directly alerting the driver to the immediate threat. The sound associated with the walking pedestrian, and/or their worried speech, may be produced in three-dimensional stereo sound via the in-car communication system such that the driver is made spatially-aware of where the walking pedestrian is relative to the vehicle. Moreover, the three-dimensional stereo sound may adjust in real-time based on the position and travel vector of the walking pedestrian. In order to provide complete context to the driver of the vehicle regarding the level of concern for the walking pedestrian, the high threat level associated with the walking pedestrian may be cause for the generated alert to be amplified in order to ensure the driver of the vehicle is aware of the presence of the walking pedestrian. The high threat level may be based on a determination that a path of the vehicle and a path of the walking pedestrian are on course for collision. The above-described methods can then be output via spatial audio as a looming sound 639 at step 650, wherein the walking pedestrian is made spatially-aware to the driver of the vehicle and the driver of the vehicle is put on alert regarding a potential collision therewith.

Such an exemplary embodiment can be compared and contrasted with the exemplary embodiment of FIG. 6C. As in FIG. 6C, the hazard type evaluated at step 636 of sub process 225 may be a train, positional characteristics of the hazard evaluated at step 637 of sub process 225 may indicate the hazard is positioned to the front right of the vehicle and is traveling perpendicularly to and away from the vehicle, and the threat level of the hazard evaluated at step 638 of sub process 225 may be determined to be of low severity. In this case, a train creates a variety of widely-appreciated and recognizable sounds and, therefore, a direct reproduction of sounds made by the train or a reproduction of pre-recorded sounds of the train may be produced as part of the generated alert. Based on an evaluation of the positional characteristics of the train, the generated alert can be produced in three-dimensional stereo sound via the in-car communication system such that the driver of the vehicle is made spatially-aware of the location of the train relative to the vehicle and, moreover, the direction of travel of the train relative to the vehicle. The three-dimensional stereo sound may adjust in real-time as the position and travel vector of the train changes. In order to provide complete context to the driver of the vehicle regarding the level of concern for the train, the low threat level associated with the train may be cause for the generated alert to be a diminuendo alert in order to alert the driver to the presence of the train without unnecessarily cautioning them thereto. Such a threat assessment can be based on the realization that the train is traveling away from the vehicle and that no intersection of travel paths is anticipated. The above-described methods can then be output via spatial audio as a receding sound 640 at step 650, wherein the train is made spatially-aware to the driver of the vehicle and the driver of the vehicle is alerted to the relatively low concern associated therewith.

As described above, the generated alert can be output to the driver of the vehicle in three-dimensional stereo sound at step 250 of the methods of the present disclosure, and the generated alert can be based on, in part, the type of hazard detected. For instance, with reference to FIG. 7, the generated alert output in three-dimensional stereo sound can be a direct reproduction of an original acoustic signal of the identified hazard 796, a reproduction of a stored audio file corresponding to the identified hazard 797, or a reproduction of a stored audio file mimicking a natural sound of the identified hazard. The original acoustic signal of the identified hazard 796 can be a direct reproduction of the acoustic signal as acquired by microphones of the vehicle sensors positioned around an exterior of the vehicle. The stored audio file corresponding to the identified hazard 797 can be a sound often associated with the identified hazard but is not a reproduction of a sound of the identified hazard. The stored audio file mimicking a natural sound of the identified hazard 798 can be an audio file of a pre-recorded original acoustic sound or a synthesized acoustic sound intended to mimic the natural sound of the identified hazard.

Figure 8:
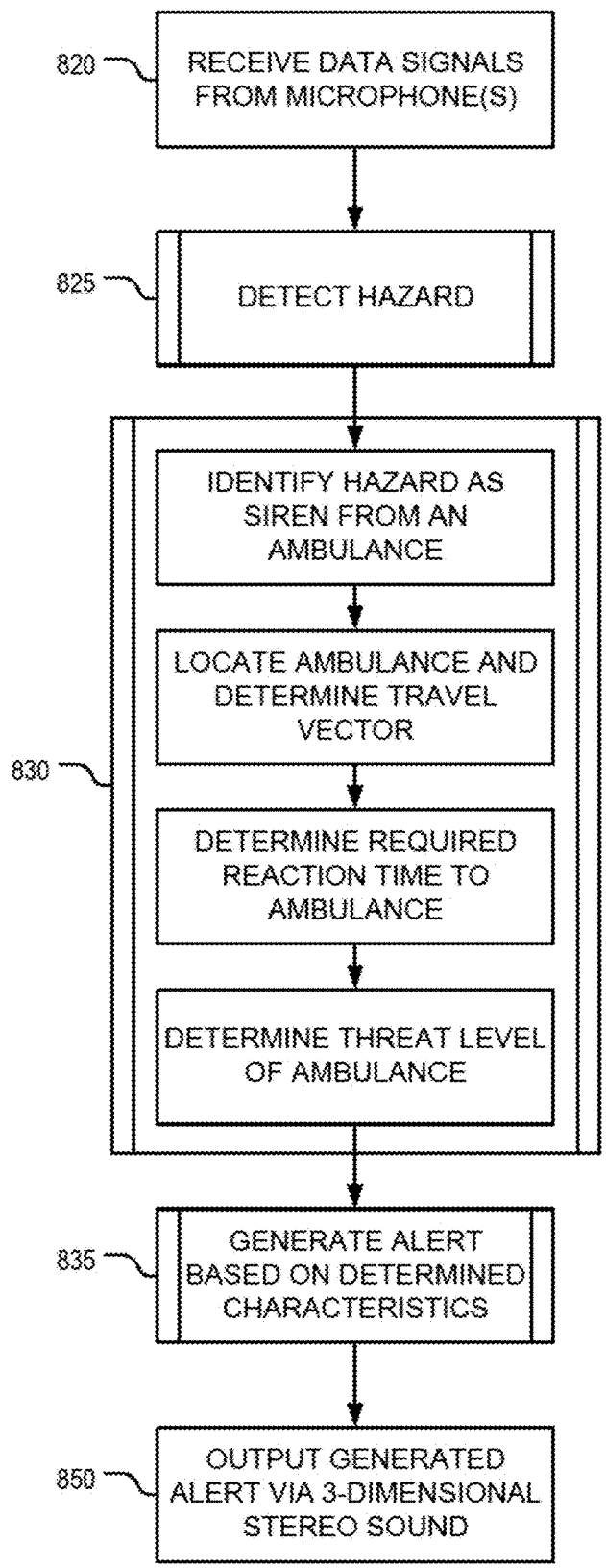
FIG. 8 is a flow diagram of an implementation of a method for providing three-dimensional stereo sound, according to an exemplary embodiment of the present disclosure.
Figure 9:
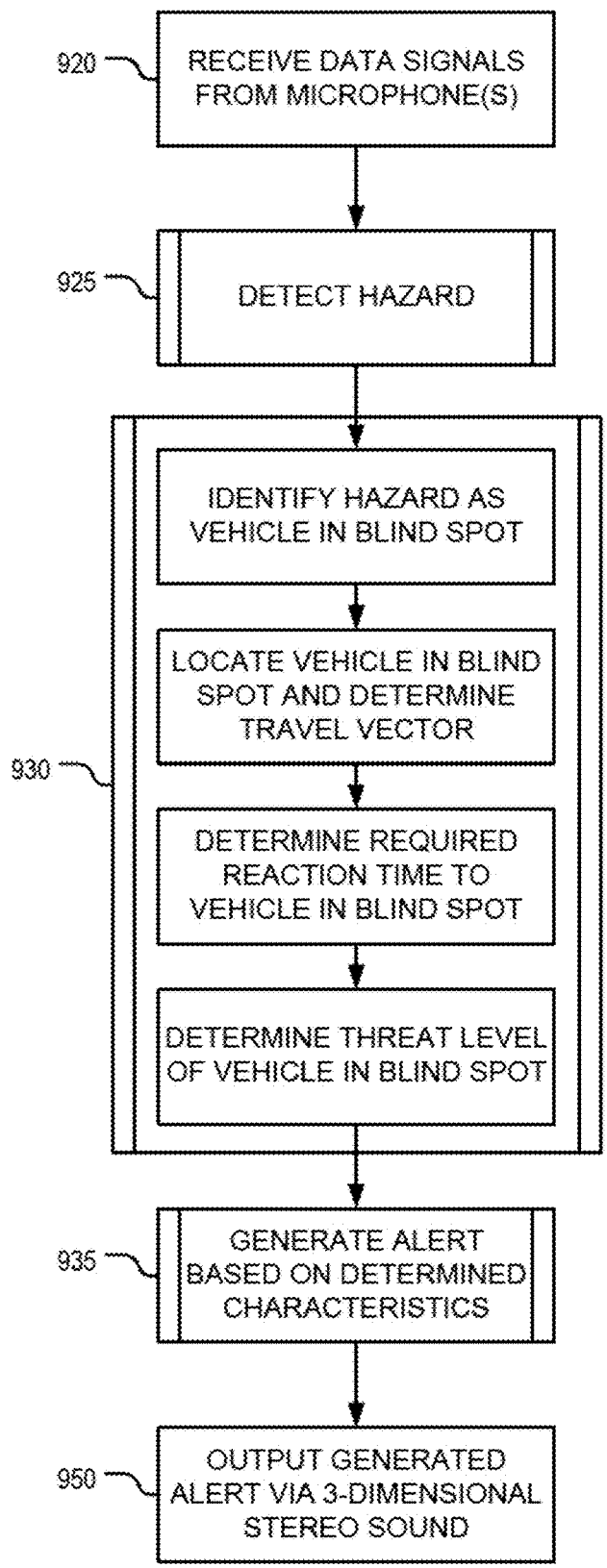
FIG. 9 is a flow diagram of an implementation of a method for providing three-dimensional stereo sound, according to an exemplary embodiment of the present disclosure.

According to an embodiment, FIG. 8 and FIG. 9 are exemplary implementations of the methods of the present disclosure. FIG. 8, for instance, describes a detection of a siren from an emergency vehicle while FIG. 9, for instance, describes a detection of a neighboring vehicle, or passing vehicle, in a 'blind spot' of a driver.

With reference to FIG. 8, data signals from microphones of vehicle sensors positioned around an exterior of a vehicle may be received by an ECU at step 820. At sub process 825, a hazard may be detected within the received data signals. At sub process 830, the detected hazard may be identified and positional characteristics of the detected hazard, along with a threat level of the detected hazard, may be determined. This includes identification of the hazard as a siren from an ambulance. This also includes determination of positional characteristics of the ambulance. In an embodiment, received data signals from the microphones of the vehicle sensors may be used to determine a direction of arrival of the siren and to determine a location of the ambulance. Using time-based analyses, a travel vector of the ambulance may similarly be determined, a requisite reaction time of the driver of the vehicle to the ambulance being determined on the basis of a relative position of the ambulance and the vehicle operated by the driver. The threat level of the ambulance may then be determined in context of a travel path of the vehicle operated by the driver. For instance, it may be determined that the ambulance is traveling towards the travel path of the vehicle operated by the driver but is not anticipated to intersect with the travel path for at least 20 seconds. As the requisite reaction time of the driver is substantially less than the time to intersection, a threat level of the ambulance may be determined to be of medium severity. Accordingly, at sub process 835, an alert can be generated based on the determined characteristics. Such a generated alert can be a direct reproduction of the siren of the ambulance and can be spatially-preserved such that the driver of the vehicle is spatially-aware of the position and travel path of the ambulance. As the threat level of the ambulance is of medium severity, no amplification or diminution of the siren of the ambulance may be appropriate. Accordingly, the generated alert can be output to the driver of the vehicle in three-dimensional stereo sound via the in-car communication system at step 850, and the driver can be made spatially-aware of the position, movements, and dangers associated with the ambulance.

Similarly, with reference to FIG. 9, data signals from microphones of vehicle sensors positioned around an exterior of a vehicle may be received by an ECU at step 920. At sub process 925, a hazard may be detected within the received data signals. At sub process 930, the detected hazard may be identified and positional characteristics of the detected hazard, along with a threat level of the detected hazard, may be determined. This includes identification of the hazard as a neighboring vehicle, or passing vehicle, in a 'blind spot' of the driver of the vehicle. In an embodiment, the detection and identification of the hazard may be confirmed by data signals received from ultrasonic sensors of the vehicle sensors positioned around the exterior of the vehicle. Further, sub process 930 includes a determination of positional characteristics of the neighboring vehicle. In an embodiment, received data signals from the microphones of the vehicle sensors may be used to determine a location of the neighboring vehicle and, using time-based analyses, a travel vector of the neighboring vehicle. Considering a hypothetical situation wherein the driver of the vehicle wishes to change lanes into the lane of the neighboring vehicle, a requisite reaction time of the driver of the vehicle can be determined on the basis of a relative position of the neighboring vehicle and the vehicle operated by the driver. The threat level of the neighboring vehicle may then be determined in context of a travel path of the vehicle operated by the driver. For instance, it may be determined that the neighboring vehicle is traveling parallel to the travel path of the vehicle operated by the driver and will soon be immediately adjacent to the vehicle operated by the driver. As the requisite reaction time of the driver may be comparable to an amount of time available to respond to the neighboring vehicle if a lane change is desired, a threat level of the neighboring vehicle may be determined to be of high severity. Accordingly, at sub process 935, an alert can be generated based on the determined characteristics. Such a generated alert can be a reproduction of a stored audio file of a sound of a vehicle (e.g., engine, tire/road noise sounds) and can be spatially-presented such that the driver of the vehicle is acutely-aware of the position and travel path of the neighboring vehicle. In an example, and without the need for visual confirmation, the driver of the vehicle can be made aware that the neighboring vehicle is passing quickly from the rear of the vehicle to the fore of the vehicle on the right side, the reproduced pre-recorded sound of a vehicle being output in three-dimensional stereo sound to the driver of the vehicle such that the exact location of the neighboring vehicle relative thereto is known. Moreover, as the threat level of the neighboring vehicle is considered to be of high severity, an amplification of the pre-recorded sound may be appropriate to alert the driver to the presence and movements of the neighboring vehicle and provide advanced notice of the possible dangers. Accordingly, the generated alert can be output to the driver of the vehicle in three-dimensional stereo sound via the in-car communication system at step 950, and the driver can be made spatially-aware of the position, movements, and dangers associated with the neighboring vehicle.

Figure 10:
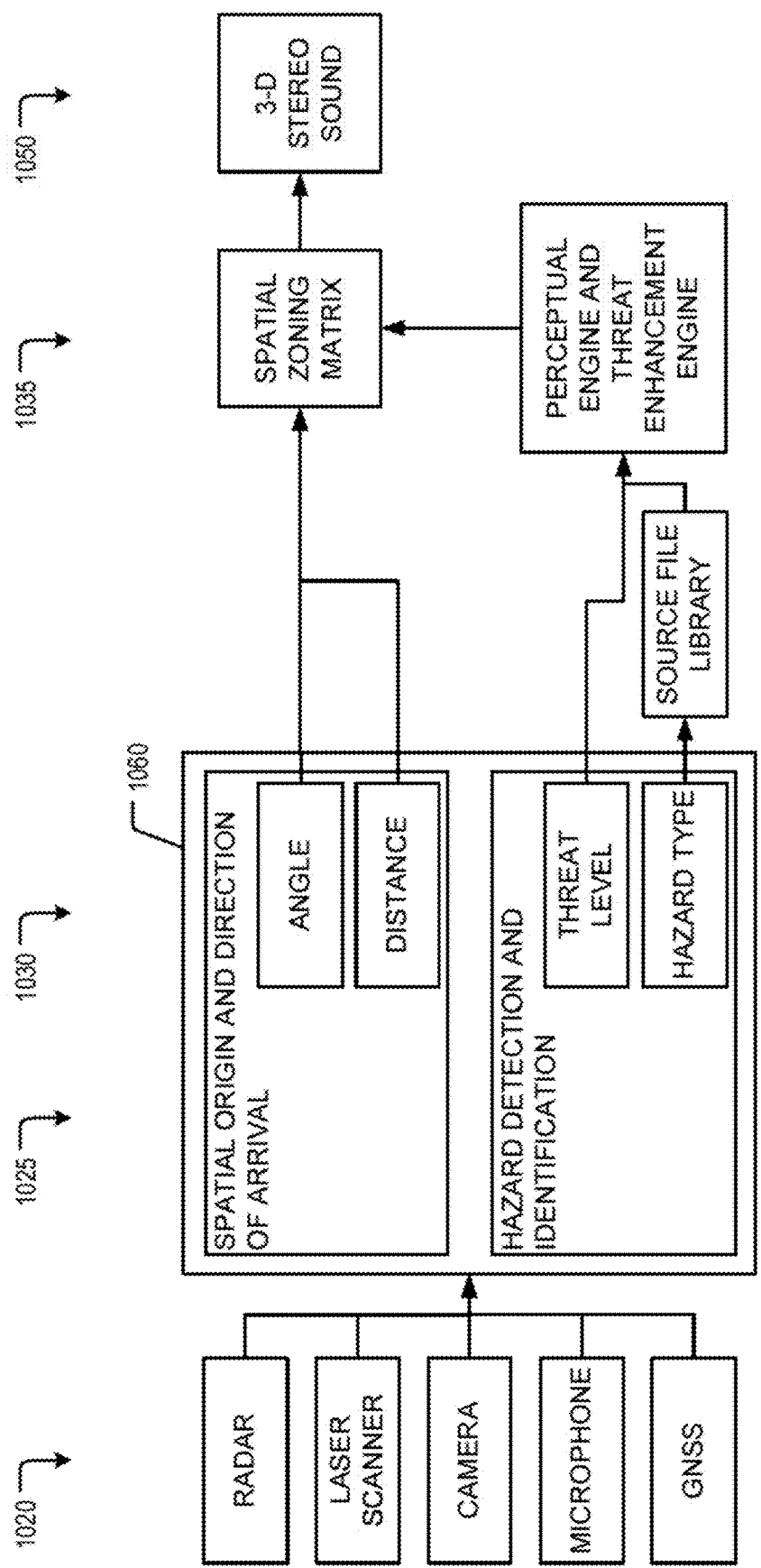
FIG. 10 is a schematic of an implementation of a method for providing three-dimensional stereo sound, according to an exemplary embodiment of the present disclosure.

FIG. 10 is an exemplary schematic of methods of the present disclosure, according to an embodiment of the present disclosure.

At step 1020, data signals can be received from a plurality of vehicle sensors, including radar, laser scanner, cameras, microphones, and a global positioning receiver, such as a Global Navigational Satellite System (GNSS) receiver. Sub process 1025 and sub process 1030 may be performed within an ECU 1060 of the vehicle to determine spatial origin and direction of arrival of a hazard and to determine an identification and threat level of the hazard. Such characteristics of the hazard, including the angle, distance, threat level, and hazard type can be supplied to sub process 1035. In particular, the angle and distance, or positional characteristics of the hazard, can be supplied to a spatial zoning matrix to ensure that a generated alert is provided to the driver of the vehicle in a spatially-accurate manner. The threat level and hazard type can be provided to a perceptual engine and threat enhancement engine, a sound file associated with the hazard type being acquired from a source file library therebetween. Accordingly, the sound file associated with the hazard type can be output, with appropriate enhancement, to the driver of the vehicle in three-dimensional stereo sound and in a manner such that the driver may perceive the generated alert as desired. In an embodiment, the generated alert may be provided to the driver by the ECU via an in-car communication system.

Figure 11:
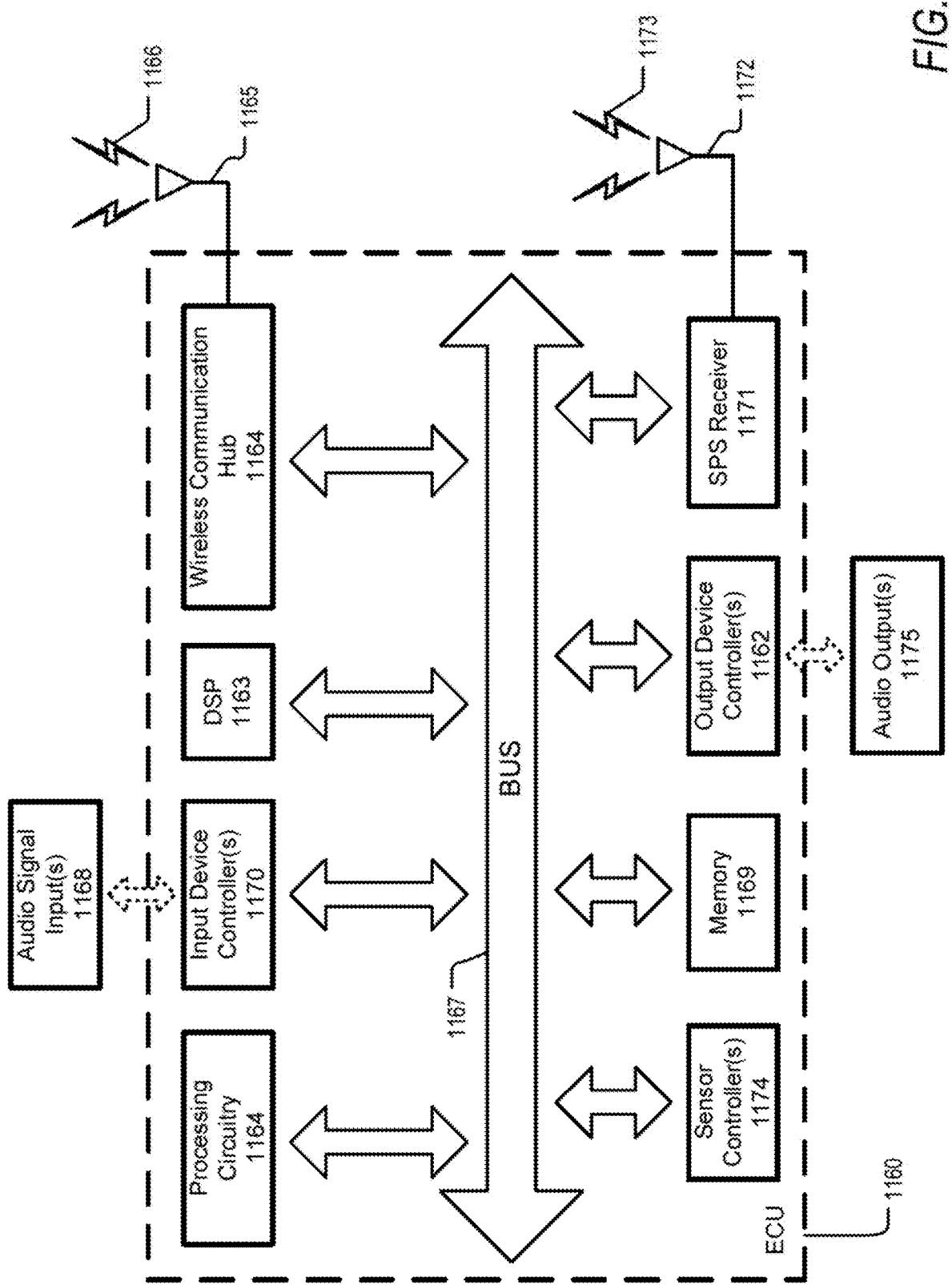
FIG. 11 is a schematic of a hardware configuration of a vehicle employing an in-car communication system, according to an exemplary embodiment of the present disclosure.

The method of the present disclosure, as described above, can be implemented in context of an ECU of a vehicle. Accordingly, FIG. 11 is a schematic of hardware components of an exemplary embodiment of an electronics control unit (ECU) 1160 that may be implemented. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Moreover, it can be appreciate that, in an embodiment, the ECU 1160 can be configured to process data (i.e. audio signal(s)) and control operation of the in-car communication system. In another embodiment, the ECU 1160 can be configured to be in communication with remote processing circuitry configured to, in coordination with the ECU 1160, process data and control operation of the in-car communication system. The remote processing circuitry may be a centralized server or other processing circuitry separate from the ECU 1160 of the vehicle. The ECU 1160 is shown comprising hardware elements that can be electrically coupled via a BUS 1167 (or may otherwise be in communication, as appropriate). The hardware elements may include processing circuitry 1161 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 1163, depending on desired functionality.

According to an embodiment, the ECU 1160 can include one or more input device controllers 1170, which can control without limitation an in-vehicle touch screen, a touch pad, microphone(s), button(s), dial(s), switch(es), and/or the like. In an embodiment, one of the one or more input device controllers 1170 can be configured to control a microphone and can be configured to receive audio signal input(s) 1168 from one or more microphones of a microphone array of the present disclosure. Accordingly, the processing circuitry 1161 of the ECU 1160 may execute processes of the processes of the present disclosure responsive to the received audio signal input(s) 1168.

In an embodiment, each microphone of a microphone array can be controlled by a centralized digital signal processor via a digital audio bus. In an example, each microphone can be an electret, MEMS, or other, similar type microphone, wherein an output of each microphone can be analog or digital. In an example, the centralized digital signal processor can be one or more distributed, local digital signal processors located at each of the auditory devices. In an example, the digital audio bus may be used for transmitting received audio signals. Accordingly, the digital audio bus can be a digital audio bus allowing for the transmittal of a microphone digital audio signal, such as an A2B bus from Analog Devices, Inc.

According to an embodiment, the ECU 1160 can also include one or more output device controllers 1162, which can control without limitation a display, a visual indicator such as an LED, speakers, and the like. For instance, the one or more output device controllers 1162 can be configured to control audio output(s) 1175 of the speakers of a vehicle such that audio output(s) 1175 levels are controlled relative to ambient vehicle cabin noise, passenger conversation, and the like.

The ECU 1160 may also include a wireless communication hub 1164, or connectivity hub, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 1164 may permit data to be exchanged with, as described, in part, a network, wireless access points, other computer systems, and/or any other electronic devices described herein. The communication can be carried out via one or more wireless communication antenna(s) 1165 that send and/or receive wireless signals 1166.

Depending on desired functionality, the wireless communication hub 1164 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The ECU 1160 can further include sensor controller(s) 1174. Such controllers can control, without limitation, one or more sensors of the vehicle, including, among others, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. In an example, the one or more sensors includes a microphone(s) configured to measure ambient vehicle cabin noise, the measured ambient vehicle cabin noise being provided to the processing circuitry 1161 for incorporation within the methods of the present disclosure.

Embodiments of the ECU 1160 may also include a Satellite Positioning System (SPS) receiver 1171 capable of receiving signals 1173 from one or more SPS satellites using an SPS antenna 1172. The SPS receiver 1171 can extract a position of the device, using various techniques, from satellites of an SPS system, such as a global navigation satellite system (GNSS) (e.g., Global Positioning System (GPS)), Galileo over the European Union, GLObal NAvigation Satellite System (GLONASS) over Russia, Quasi-Zenith Satellite System (QZSS) over Japan, Indian Regional Navigational Satellite System (IRNSS) over India, Compass/BeiDou over China, and/or the like. Moreover, the SPS receiver 1171 can be used by various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multifunctional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 1160 may further include and/or be in communication with a memory 1169. The memory 1169 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1169 of the ECU 1160 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended Figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for providing three-dimensional stereo sound, comprising receiving data signals from sensors positioned around an exterior of a vehicle, detecting a hazard based on the received data signals, determining characteristics of the detected hazard, generating, by processing circuitry, an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

(2) The method of (1), wherein at least one of the sensors is a microphone and the generating generates the alert as a reproduction of an original acoustic signal received at the at least one microphone.

(3) The method of either (1) or (2), wherein the generating generates the alert based on an audio file acquired from an audio file database, the audio file corresponding to the detected hazard.

(4) The method of any one of (1) to (3), wherein the audio file corresponding to the detected hazard is an audio file mimicking a natural sound of the detected hazard.

(5) The method of any one of (1) to (4), wherein the detecting detects the hazard by classifying the received data signals as hazards based on a reference database of labeled data signals.

(6) The method of any one of (1) to (5), wherein the determined characteristics of the detected hazard include a hazard type, a relative position of the detected hazard, a reaction time necessary to avoid the detected hazard, a travel vector of the detected hazard, and a threat level of the detected hazard.

(7) The method of any one of (1) to (6), wherein the generating generates the alert based on a severity of the determined threat level of the detected hazard.

(8) The method of any one of (1) to (7), wherein an amplitude of the generated alert is enhanced or dampened according to the severity of the determined threat level of the detected hazard.

(9) An apparatus for providing three-dimensional stereo sound, comprising processing circuitry configured to receive data signals from sensors positioned around an exterior of a vehicle, detect a hazard based on the received data signals, determine characteristics of the detected hazard, generate an alert based on the determined characteristics of the detected hazard, and output the generated alert as the three-dimensional stereo sound via speakers arranged around an interior of the vehicle, the outputted alert communicating to a driver of the vehicle the determined characteristics of the detected hazard.

(10) The apparatus of (9), wherein the processing circuitry is configured to detect the hazard by classifying the received data signals as hazards based on a reference database of labeled data signals.

(11) The apparatus of either (9) or (10), wherein the determined characteristics of the detected hazard include a hazard type, a relative position of the detected hazard, a reaction time necessary to avoid the detected hazard, a travel vector of the detected hazard, and a threat level of the detected hazard.

(12) The apparatus of any one of (9) to (11), wherein the processing circuitry is configured to generate the alert based on a severity of the determined threat level of the detected hazard.

(13) A non-transitory computer-readable storage medium storing computer-readable instructions that, when executed by a computer, cause the computer to perform a method for providing three-dimensional stereo sound, the method comprising receiving data signals from sensors positioned around an exterior of a vehicle, detecting a hazard based on the received data signals, determining characteristics of the detected hazard, generating an alert based on the determined characteristics of the detected hazard, and outputting the generated alert as the three-dimensional stereo sound via speakers arranged around an interior of the vehicle, the outputted alert communicating to a driver of the vehicle the determined characteristics of the detected hazard.

(14) The non-transitory computer-readable storage medium of (13), wherein the determined characteristics of the detected hazard include a hazard type, a relative position of the detected hazard, a reaction time necessary to avoid the detected hazard, a travel vector of the detected hazard, and a threat level of the detected hazard.

(15) The non-transitory computer-readable storage medium of either (13) or (14), wherein the generating generates the alert based on a severity of the determined threat level of the detected hazard.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for providing three-dimensional stereo sound, comprising:
   receiving data signals from sensors positioned around an exterior of a vehicle;
   detecting a hazard based on the received data signals;
   determining characteristics of the detected hazard;
   generating, by processing circuitry, an alert based on the determined characteristics of the detected hazard; and
   outputting the generated alert as the three-dimensional stereo sound via speakers arranged around an interior of the vehicle, the outputted alert communicating to a driver of the vehicle the determined characteristics of the detected hazard, wherein the determined characteristics of the detected hazard include a hazard type, a relative position of the detected hazard, a reaction time necessary to avoid the detected hazard, a travel vector of the detected hazard, and a threat level of the detected hazard.

2. The method of claim 1, wherein the generating generates the alert based on an audio file acquired from an audio file database, the audio file corresponding to the detected hazard.

3. The method of claim 2, wherein the audio file corresponding to the detected hazard is an audio file mimicking a natural sound of the detected hazard.

4. The method of claim 1, wherein the detecting detects the hazard by classifying the received data signals as hazards based on a reference database of labeled data signals.

5. The method of claim 1, wherein at least one of the sensors is a microphone and the generating generates the alert as a reproduction of an original acoustic signal received at the at least one microphone.

6. The method of claim 1, wherein the generating generates the alert based on a severity of the determined threat level of the detected hazard.

7. The method of claim 6, wherein an amplitude of the generated alert is enhanced or dampened according to the severity of the determined threat level of the detected hazard.

8. An apparatus for providing three-dimensional stereo sound, comprising:
   processing circuitry configured to
      receive data signals from sensors positioned around an exterior of a vehicle, detect a hazard based on the received data signals,
determine characteristics of the detected hazard,
generate an alert based on the determined characteristics of the detected hazard, and
output the generated alert as the three-dimensional stereo sound via speakers arranged around an interior of the vehicle, the outputted alert communicating to a driver of the vehicle the determined characteristics of the detected hazard wherein:
the processing circuitry is configured to detect the hazard by classifying the received data signals as hazards based on a reference database of labeled data signals, and
the determined characteristics of the detected hazard include a hazard type, a relative position of the deleted hazard, a reaction time necessary to avoid the detected hazard, a travel vector of the detected hazard and a threat level of the detected hazard.

9. The apparatus of claim 8, wherein the processing circuitry is configured to generate the alert based on a severity of the determined threat level of the detected hazard.

10. A non-transitory computer-readable storage medium storing computer-readable instructions that, when executed by a computer, cause the computer to perform a method for providing three-dimensional stereo sound, the method comprising:
receiving data signals from sensors positioned around an exterior of a vehicle;
detecting a hazard based on the received data signals;
determining characteristics of the detected hazard;
generating, by processing circuitry, an alert based on the determined characteristics of the detected hazard; and
outputting the generated alert as the three-dimensional stereo sound via speakers arranged around an interior of the vehicle, the outputted alert communicating to a driver of the vehicle the determined characteristics of the detected hazard, wherein the determined characteristics of the detected hazard include a hazard type, a relative position of the detected hazard, a reaction time necessary to avoid the detected hazard, a travel vector of the detected hazard, and a threat level of the detected hazard.

11. The non-transitory computer-readable storage medium of claim 10, wherein the generating generates the alert based on a severity of the determined threat level of the detected hazard.

* * * * *